United States Patent [19]

Ouimette

[11] 4,002,887
[45] Jan. 11, 1977

[54] DIGITAL AREA NAVIGATION SYSTEM AND COMBINED MAGNETIC CARD READER AND ENCODER

[75] Inventor: Blaine N. Ouimette, Independence, Mo.

[73] Assignee: King Radio Corporation, Olathe, Kans.

[22] Filed: Apr. 18, 1975

[21] Appl. No.: 569,573

[52] U.S. Cl. .......................... 235/61.11 D; 360/88
[51] Int. Cl.² ................... G06K 7/08; G11B 15/00
[58] Field of Search .............. 235/61.5 D, 150.23, 235/150.26, 150.27, 61.11 R, 61.11 D, 61.11 A, 61.6 R, 61.7 R; 360/2, 88; 200/46

[56] References Cited

UNITED STATES PATENTS

| | | | |
|---|---|---|---|
| 3,627,934 | 12/1971 | Riddle | 235/61.11 D |
| 3,663,734 | 5/1972 | Howland et al. | 235/150.27 |
| 3,708,790 | 1/1973 | Nourigat | 235/61.12 M |
| 3,787,661 | 1/1974 | Moorman et al. | 235/61.11 R |
| 3,793,507 | 2/1974 | Blizard et al. | 235/61.7 R |

Primary Examiner—Daryl W. Cook
Attorney, Agent, or Firm—Lowe, Kokjer, Kircher

[57] ABSTRACT

An automatic data input/output system has combined card reading and recording device features which permit a pilot to totally utilize same as part of an aircraft navigation system. A small light weight drive system is incorporated within the device to move the magnetic card with respect to the read-write heads.

The operational modes of the system include a MONITOR MODE, a RECORD MODE, an ENTER MODE, and an ERROR MODE. This permits a pilot to encode or record navigational data on a magnetic card or read the data from the card and automatically input same to a device for assisting in the navigation of the aircraft. The ERROR MODE provides a means for checking the data as read from the card to insure the accuracy of same before it can be used by the navigational device.

41 Claims, 21 Drawing Figures

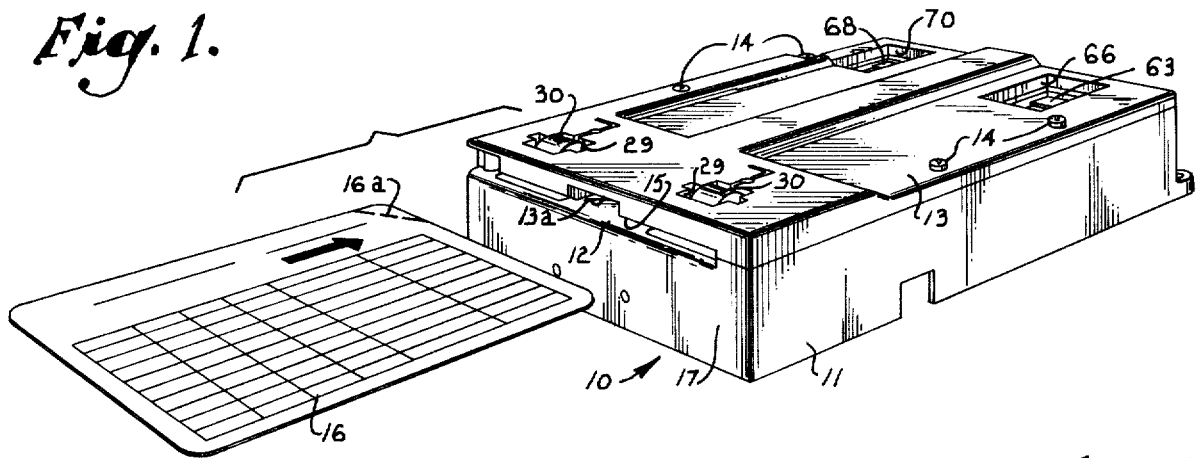
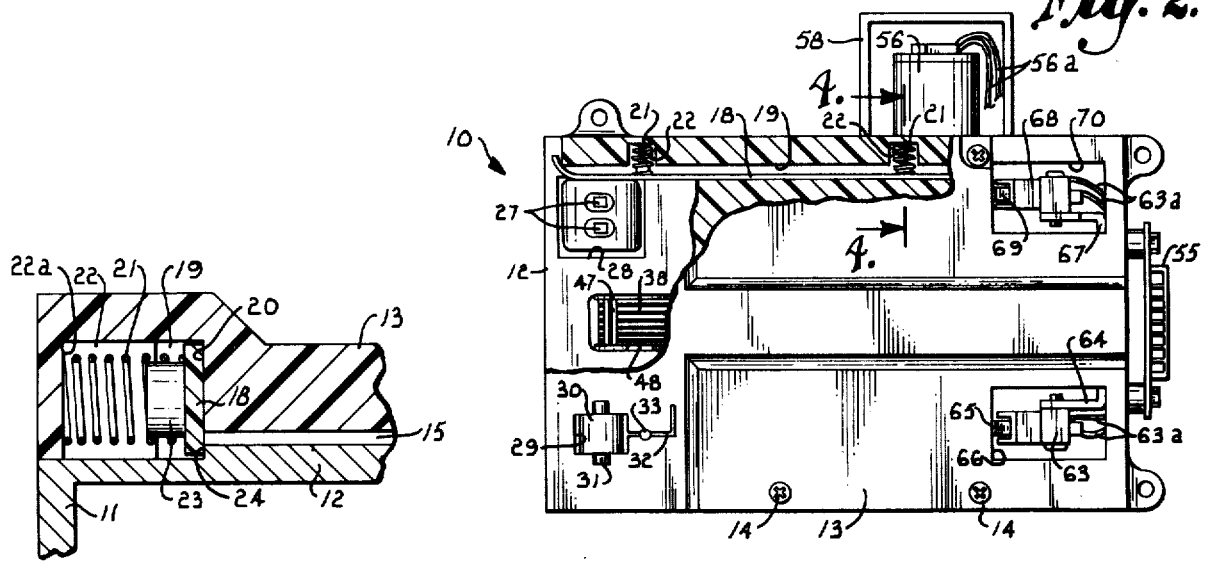
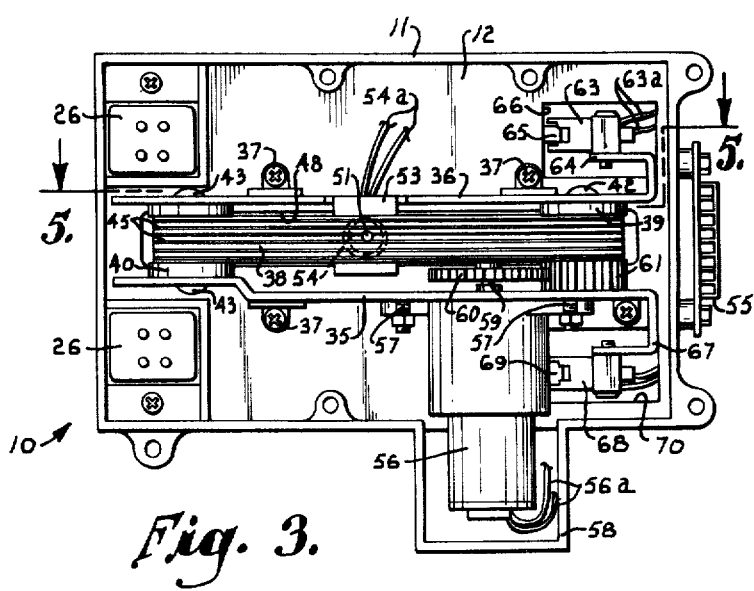

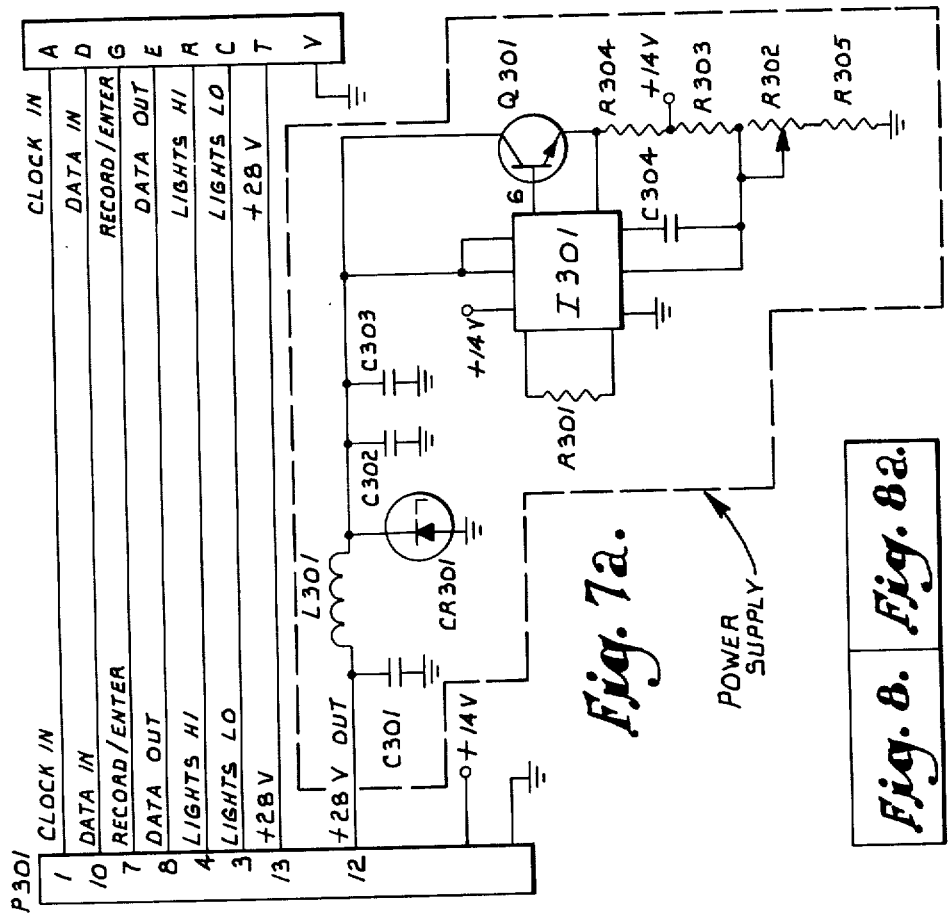
Fig. 7a.
Fig. 8. Fig. 8a. Fig. 11.
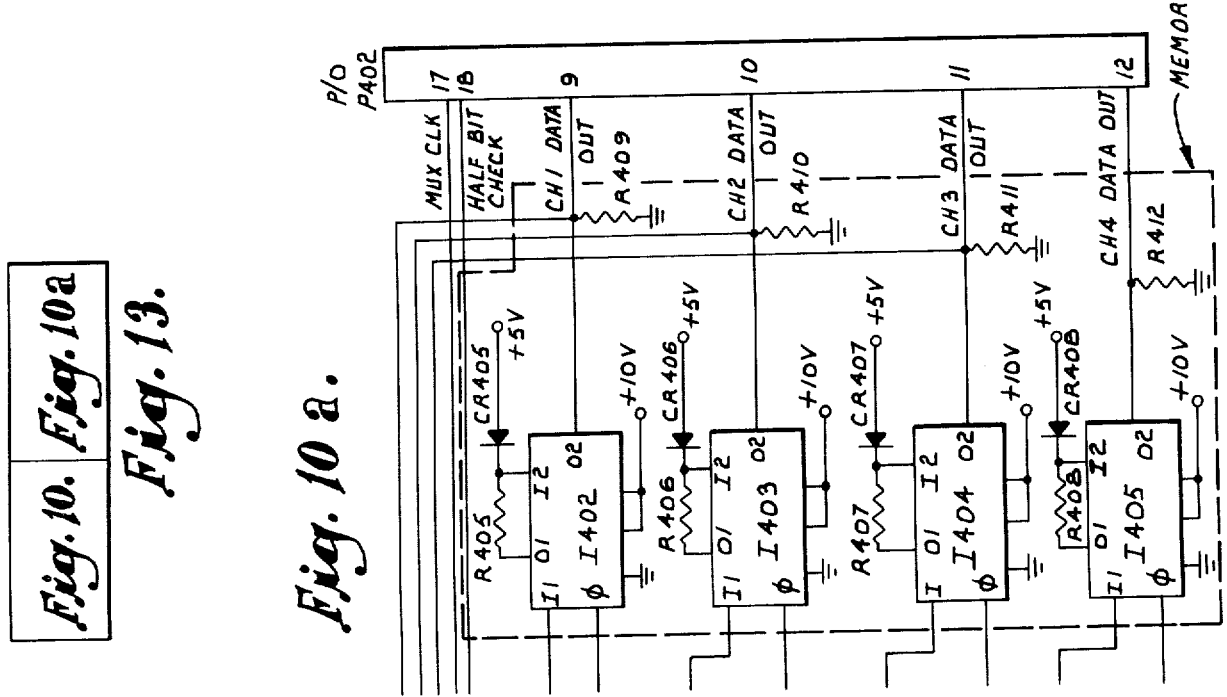
Fig. 10. Fig. 10a. Fig. 13.
Fig. 10 a.

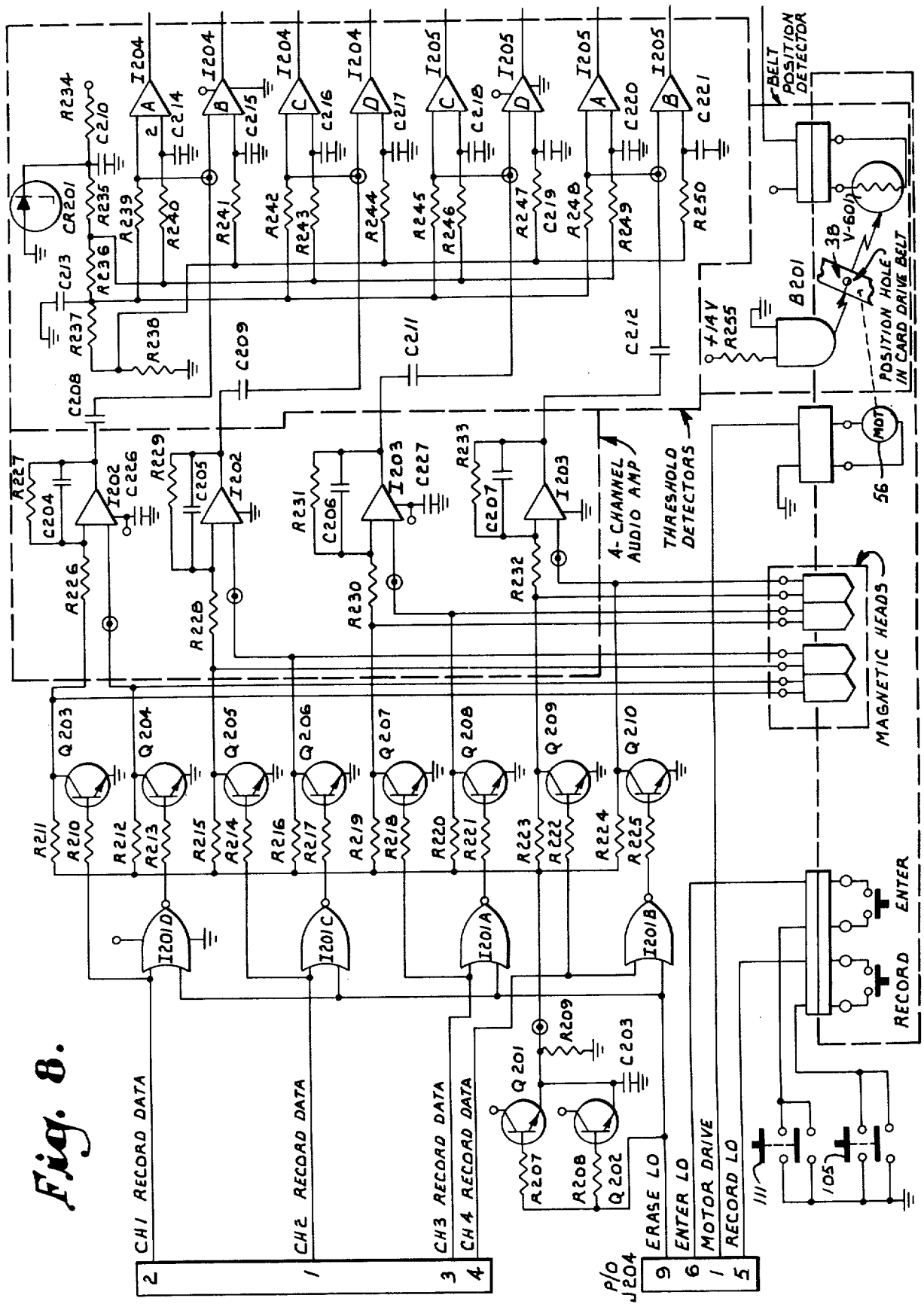

DIGITAL AREA NAVIGATION SYSTEM AND COMBINED MAGNETIC CARD READER AND ENCODER

BRIEF DESCRIPTION OF THE INVENTION

The combined card reader and recording device is designed to be used in conjunction with a digital area navigation system of the type manufactured by the King Radio Corporation of Olathe, Kansas, and identified by the product numbers KNR-665 and the associated digital control unit also manufactured by the King Radio Corporation and identified by the product number KCU-565. Both the digital area navigation system and the digital control unit therefor have been described in detail in a King Radio publication entitled "Keyboard Control Units —Maintenance/Overhaul Manual" printed in April of 1974.

FIG. 6 shows the face of the remote unit for an area navigation system along with the combined card reader and recording device. As indicated therein, the digital area navigation system is a push button tuned RNAV system with a 10 waypoint memory capacity. Additionally, the unit will include a function switch which selects conventional VOR/DME operation designated VOR, enroute area navigation designated ENROUTE, approach and terminal navigation designated APPR. A DSPY/WPTCRS window enunciates the waypoint and course in use. A freq/keyboard window displays the waypoint facility frequency when display is constant and displays the contents of the keyboard when flashing on and off. The course window displays the selected course in degrees. The WPT radial window displays the VOR radial on which the waypoint is placed. The WPR distance window displays the distance along the selected VOR radial on which the waypoint is displayed. The button containing the horizontally directed arrowhead puts the displayed waypoint into use. The CRS-1 key selects course 1 (inbound course) while the CR-2 key selects course 2 (outbound course). The 0–9 keys operate on the depression of each one of the keys to enter one digit on the keyboard. The auto CRS key computes and enters the course from the present position to the facility, either VOR (in a VOR mode) or waypoint (in an RNAV mode). The KYBD CLR key clears the keyboard. The NAV test key is active in the ENROUTE MODE only and by depressing same initiates a three part test sequence. Finally, the load keys are located to the right of the freq/keyboard 6a, course 6b, WPT radial 6c and WPT distance 6d windows and cause data from the keyboard to be loaded in the respective windows. Other information such as programming the waypoints and utilization of the area navigation system and changing waypoints are fully described in the above-mentioned installation manual.

The digital control unit, which is functionally operable with the face panel of the digital area navigation system shown in FIG. 6, provides the memory for the total system. Once data is entered into the memory it will remain unchanged until new data is entered (which changes the old data) or power is removed from the control unit. The internal memory organization of the digital control unit is described in detail in the above mentioned "Maintenance Overhaul Manual," along with an output data format and a general block diagram.

The subject invention which includes the card reader and recording device which may be otherwise thought of as an automatic data input/output system is specifically designed for use with the digital control unit. This permits magnetic card storage of the digital control unit memory which may be comprised of all pertinent data up to 10 waypoints. Accordingly, a pilot can build a "library" corresponding to the commonly used routes. The invention contemplates the utilization of a card reader by the pilot in the aircraft which is not only capable of reproducing data from cards but also writing data thereon.

It is an object of the subject invention to provide a unique method and avionics apparatus for permitting pilot utilization of a combined card reader and programming device.

Another object of the invention is to provide a unique avionics system for writing magnetic data on a card. It is a feature of this object that the traditional need for an erase head has been obviated.

A further object of the invention is to provide a combined readwrite system for magnetic recording that is inexpensive to manufacture and capable of being made extremely compact. It is a feature of this object that high frequency bias may be injected into the system to facilitate magnetic erasure and a program which may be appropriately interrupted for the writing operation upon the occurrence of a data bit.

Another object of the invention is to provide a unique avionics navigation aid and safety device. With known RNAV unit memories, the loss of system power, even for a few moments, dumps all the information stored therein. In a panic situation, all the pilot would need to do with the subject invention is to insert a card into the system described above in order to instantaneously reload the memories.

Another object of the invention is to provide an avionics system of the character described that automatically disregards data read from a card and signals the pilot when an error occurs.

A still further object of the invention is to provide a unique carriage and card transport for an avionics magnetic card reader-programming device.

A further object of the invention is to provide a unique means for controlling card movement through a card reader and programming device. It is a feature of the object that photo-electric means are provided for positioning as well as signalling the location of the card during various modes of operation.

Another object of the invention is to provide an avionics magnetic card reader and programming device having a unique multiplexer. It is a feature of the multiplexer system that it will "look" at four separate channels simultaneously but has one mass output. Therefore, counts coming out of any one of the four channels will be multiplexed into one master counter.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views:

FIG. 1 is a perspective view of the card reader carriage assembly and magnetic card;

FIG. 2 is a top plan view of the card reader carriage assembly shown in FIG. 1 with portions of the top panel broken away to show the upper belt surface and one of the magnetic heads;

FIG. 3 is a bottom plan view of the carriage assembly shown in FIG. 2;

FIG. 4 is an enlarged sectional view taken along the line 4—4 of FIG. 2 in the direction of the arrows;

FIG. 7a is a detailed schematic diagram of the power supply and filter board utilized with the automatic data input/output system;

Figure 9:
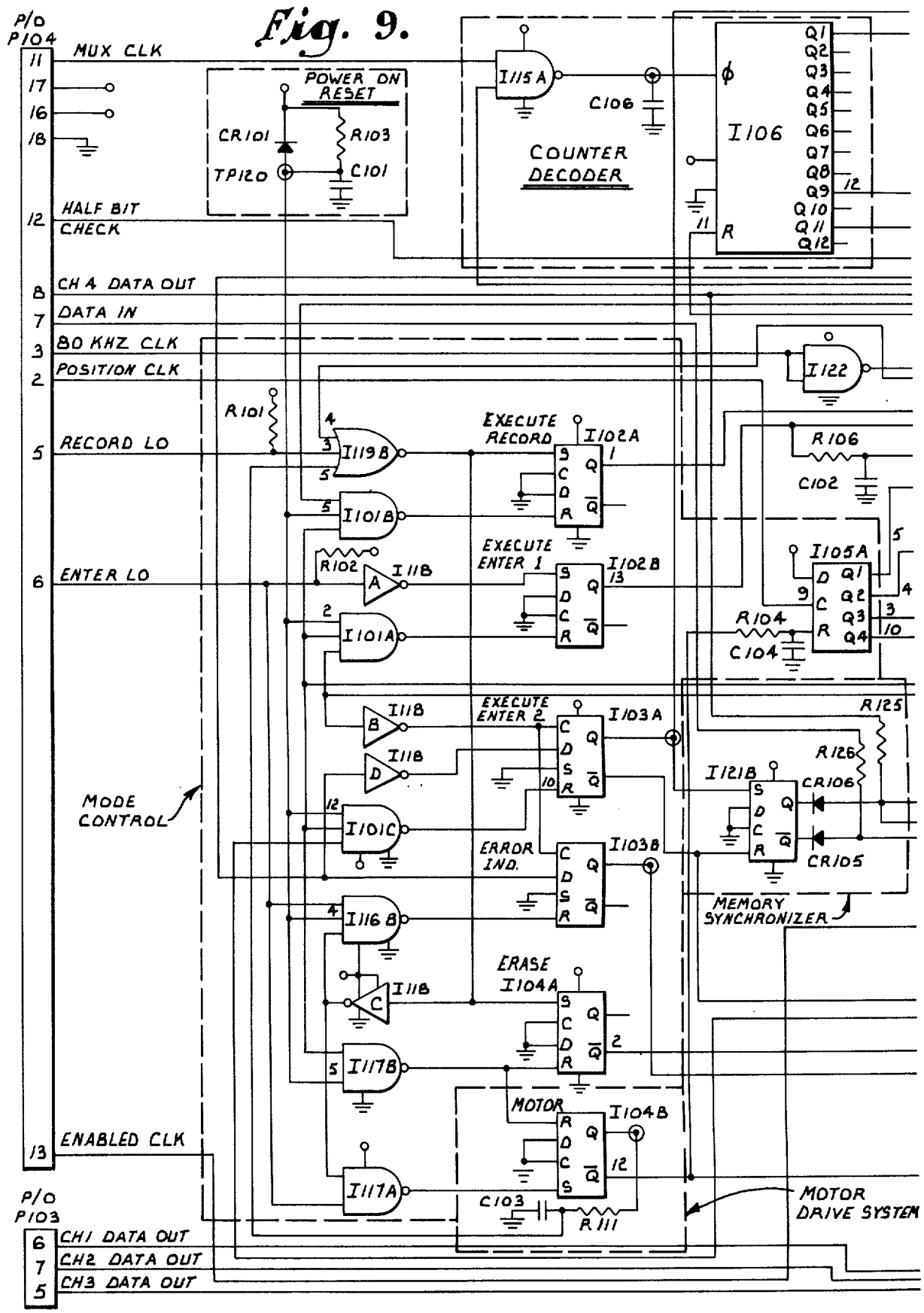
Figure 9A:
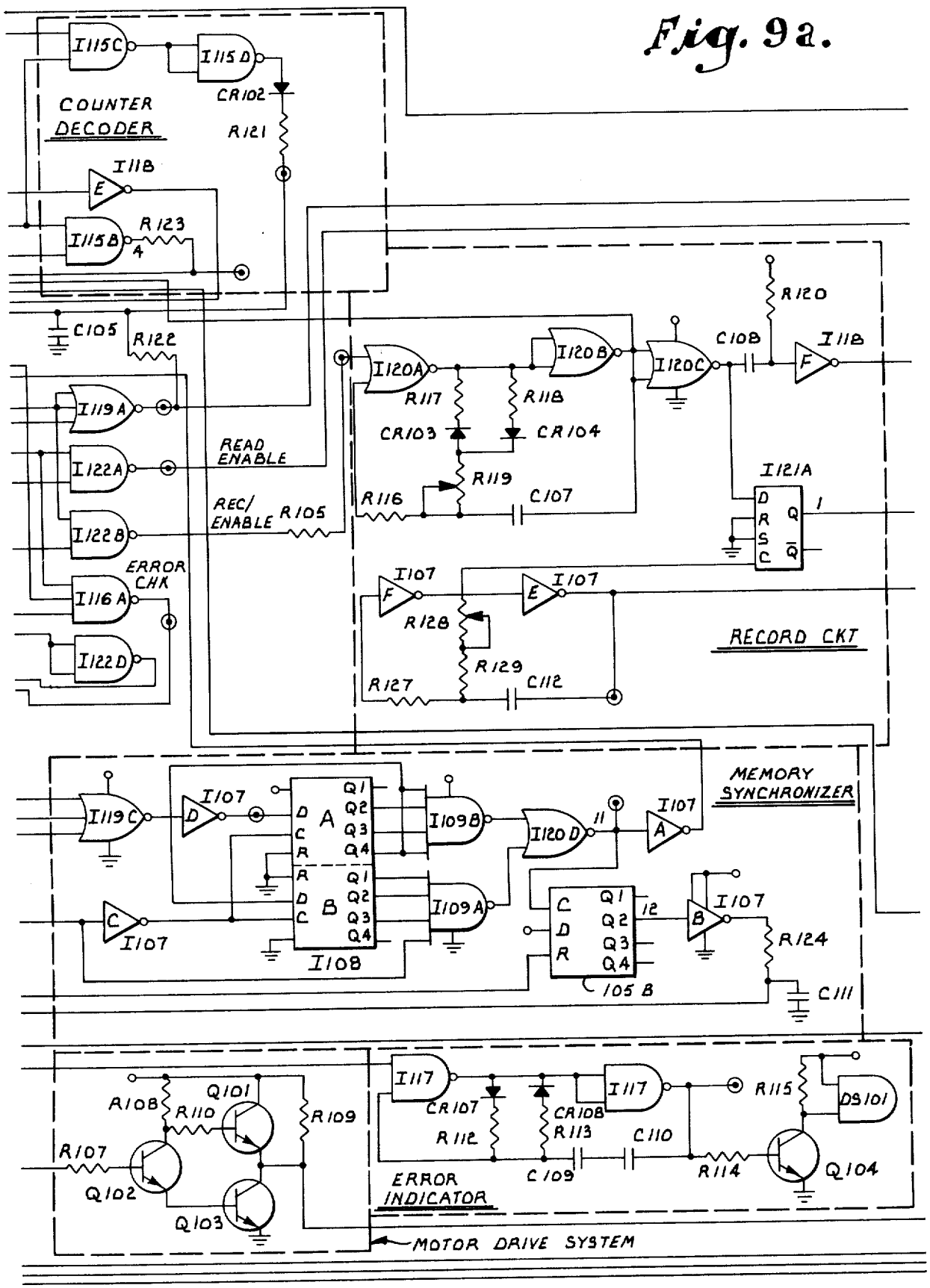
Figures 9B, 12:
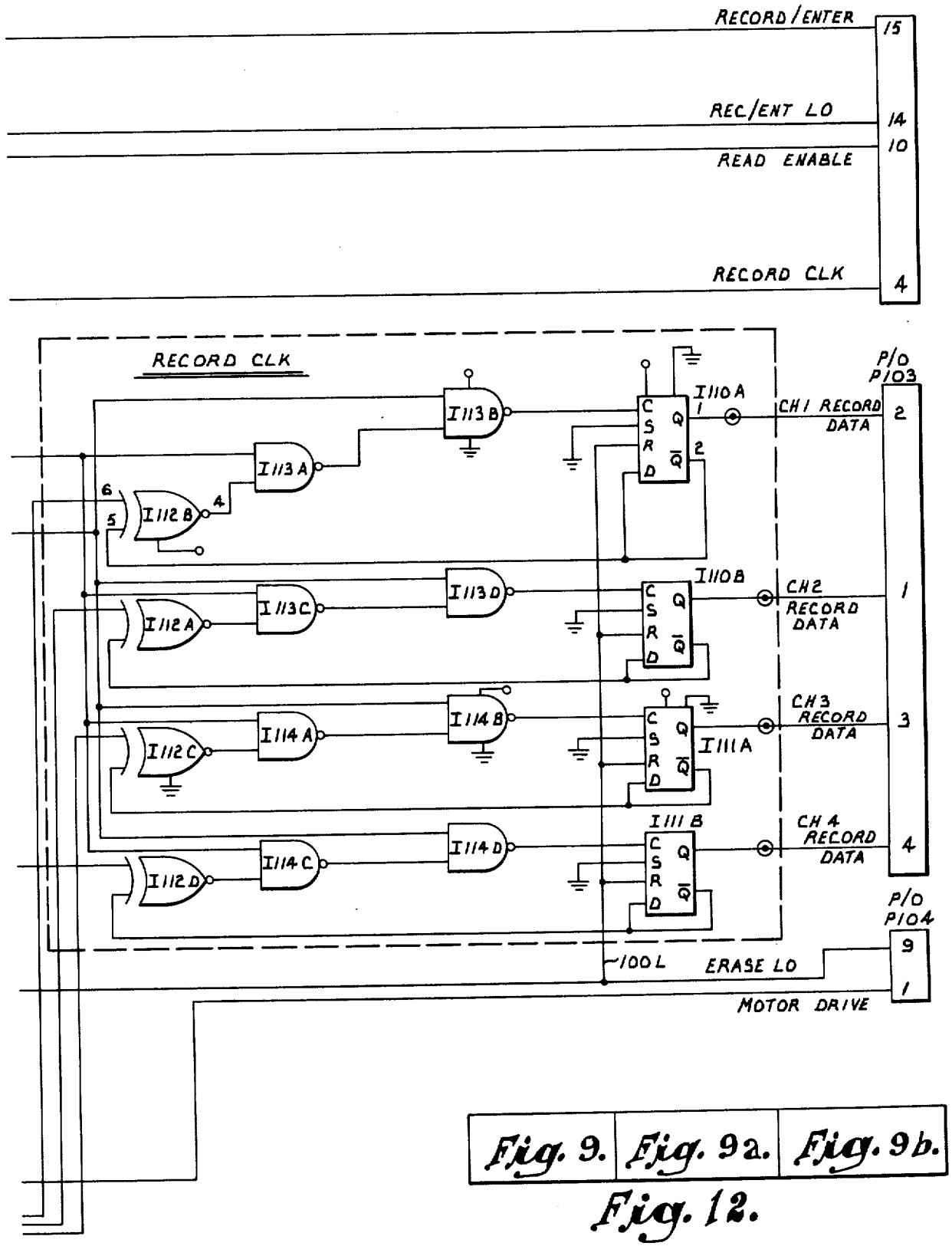
Figure 10:
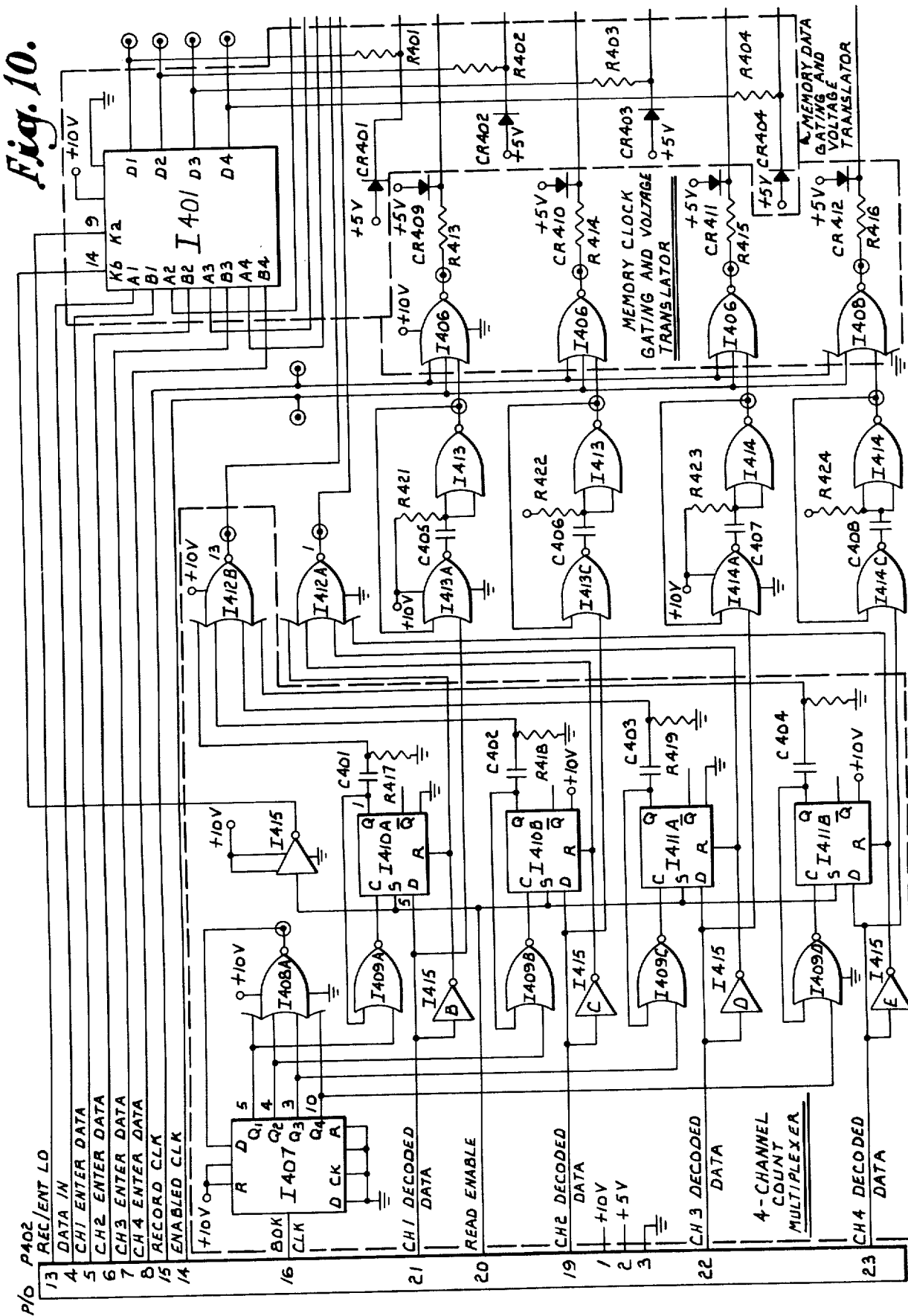
Figure 14:
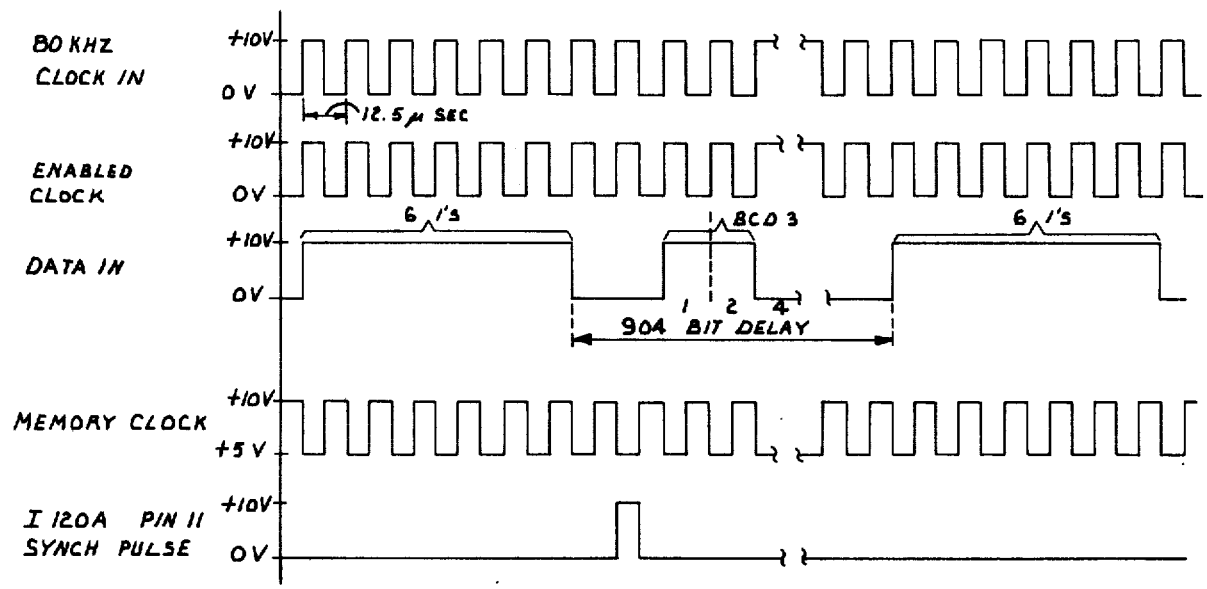
Figure 15:
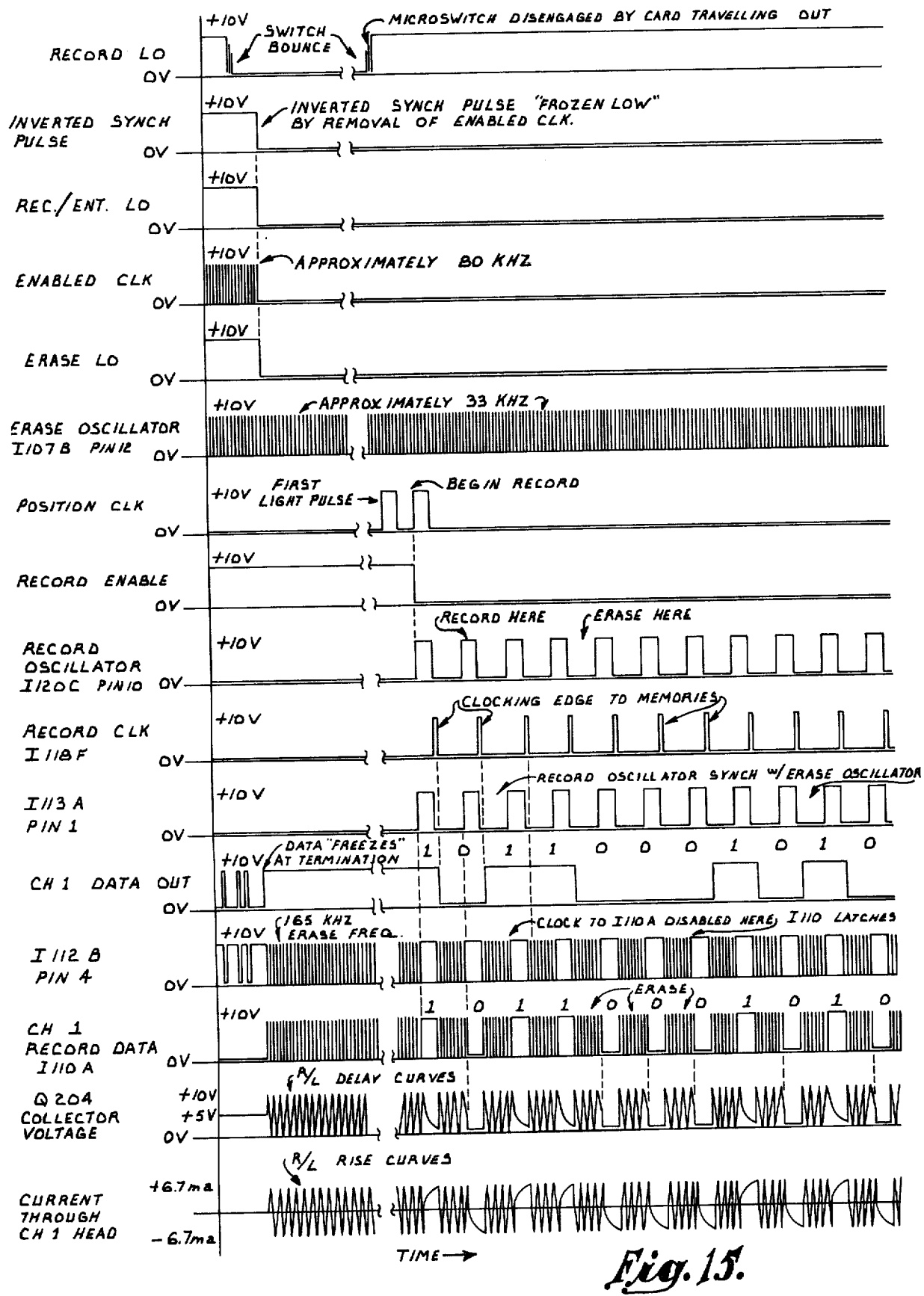

FIGS. 8 and 8a, which are to be organized as shown in FIG. 11, are schematic diagrams located on a single printed circuit board and showing the four channel audio amplifier, the threshold detectors, the data decoder, the magnetic heads, the belt position detector, and portions of the power supply which is to be used in conjunction with FIG. 7a;

FIGS. 9, 9a and 9b, which are to be organized as shown in FIG. 12, are schematic diagrams of another portion of the automatic data input/output system and showing therein the power on reset circuit, the mode control circuitry, the motor drive system, the memory synchronizer, the counter decoder, the record circuit, and the error indicator;

FIGS. 10 and 10a are detailed schematic diagrams of another portion of the automatic data input/output system to be arranged as shown in FIG. 13 and having therein the four channel count multiplexer circuit, the memory clock gating and voltage translator circuit, the memory data gating and voltage translator circuitry, memory circuit, and other gates which are utilized to clock the memories;

FIG. 11 is an organizational diagram showing how FIGS. 8 and 8a are to be organized;

FIG. 12 is an organizational block diagram showing how FIGS. 9, 9a and 9b are to be organized;

FIG. 13 is an organizational block diagram showing how FIGS. 10 and 10a are to be organized;

FIG. 14 is a waveform diagram or timing diagram for the MONITOR MODE;

FIG. 15 is a waveform or timing diagram for the RECORD MODE; and

Figure 16:
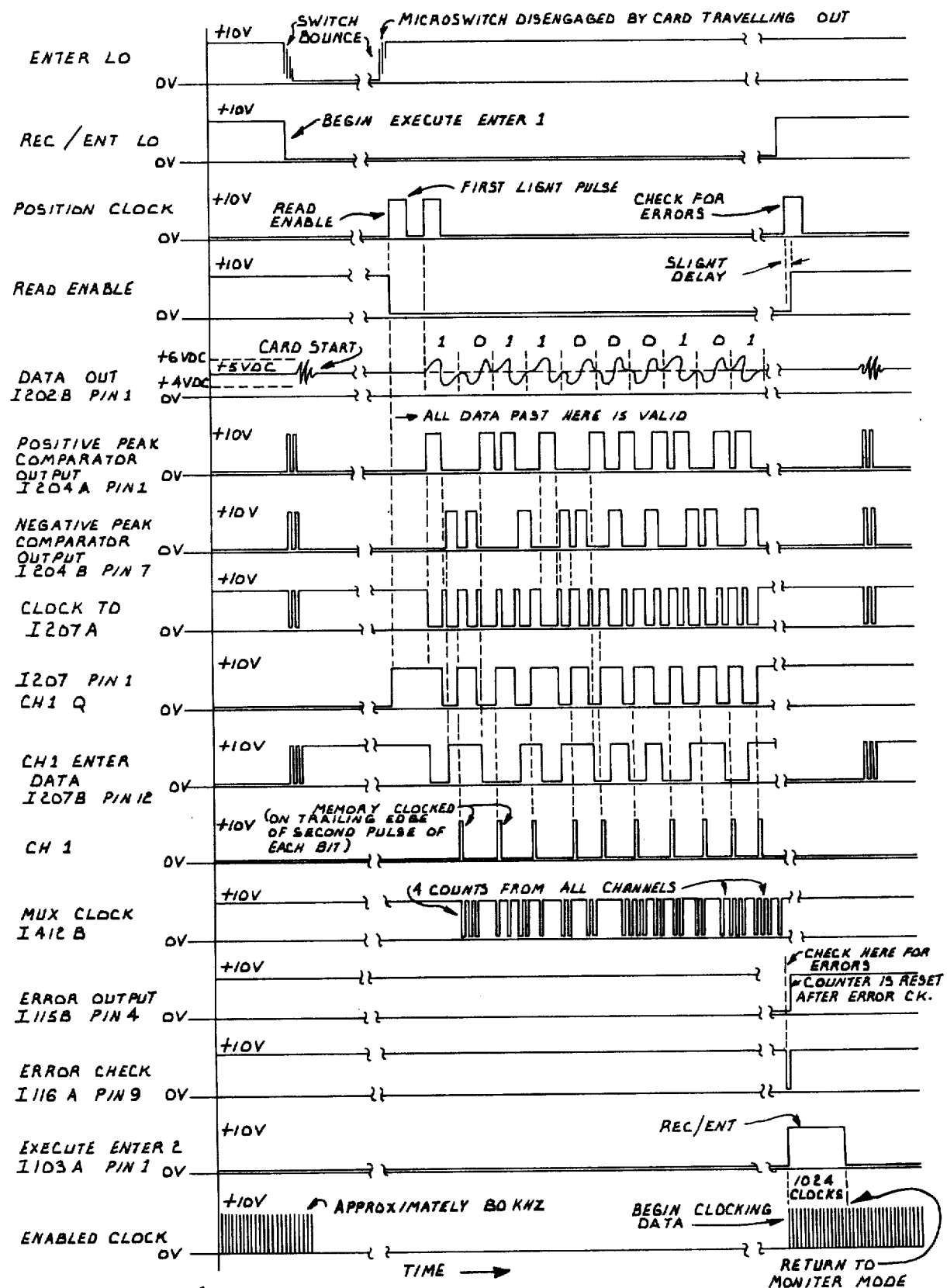

FIG. 16 is a waveform or timing diagram for the ENTER MODE.

Referring now to the drawings in detail and initially to FIG. 1, reference numeral 10 generally designates a card reader carriage assembly and programming device which includes a rectangular metal housing 11. The device has a flat, horizontal deck 12 that is integral with housing 11 and covers the top thereof. A rectangular upper panel 13 (which may be constructed of a plastic material) is secured to the top of housing 11 by a plurality of screws 14. The lower surface of panel 13 is spaced a short distance above deck 12 such that a thin rectangular slot 15 is formed in the area between upper panel 13 and the deck.

Slot 15 extends into the device from the front end thereof (or the left end as viewed in FIG. 1) and is sized to receive a rectangular magnetic card 16 which is about the size of a conventional wallet-sized credit card. The right hand edge of deck 12 (as viewed from the front) has a short ridge 17 (FIG. 1) projecting upwardly therefrom. The flat interior surface of ridge 17 defines the right edge of slot 15 and is precision milled to bear against the right edge of an inserted card 16. With reference to FIGS. 2 and 4 in particular, it may be seen that a thin elongate spring biased bar 18 is provided at the left edge of slot 15 and extends interiorly thereof.

The above mentioned bar 18 is contained within a recess 19 which is formed in upper panel 13 and aligned with the left (FIG. 4) edge of card carrying deck 12. Recess 19 is bounded on its inward side by a flat vertical surface 20 (FIG. 4) so that a pair of compression springs 21 may continuously urge bar 18 inwardly toward surface 20. Springs 21 are disposed in cavities 22 formed in upper panel 13 adjacent to recess 19 One end of each spring 21 bears against the outer cavity surface 22a, while the opposite end of each spring 21 is coiled around a cylindrical boss 23 that projects from the outer surface of bar 18 at selected locations along its length. With the lower surface of slot 15 being above the lower surface of recess 19, a small vertical shoulder 24 is formed in deck 12 at a location directly below surface 20 so that, in the absence of a card in slot 15, springs 21 bias bar 18 toward the position shown in FIG. 4, wherein the bar is oriented vertically in contact with surface 20 and s shoulder 24. However, when a card 16 is inserted in slot 15, bar 18 (acted on by springs 21) pushes against the left edge of the card (as viewed from the front) to retain the opposite or right edge of the card against the milled surface of the ridge 17, thereby insuring proper card orientation when it is within the reader and programming (carriage assembly) device.

With reference to FIGS. 2 and 3, a pair of magnetic tape head units 26 are mounted in apertures within deck 12 adjacent the forward end of housing 11 and near the opposite sides thereof. Each unit 26 includes two magnetic tape heads 27. As suggested, a pair of rectangular apertures 28 (only one of which is seen in FIG. 2) are formed through deck 12 near the opposite front corners thereof so that the tape heads 27 of each unit 26 may project upwardly through openings 28 substantially coplanar with deck 12 and into contact with the bottom surface of a magnetic card 16 when located within the device. As will be described, the tape heads operate to record data on the magnetic cards as well as to read previously recorded data.

Upper panel 13 has a pair of irregularly shaped openings 29 that are located directly above the respective magnetic head unit openings 28. A cylindrical roller 30 is mounted within each opening 29 for free rotation about a horizontal shaft 31 (FIG. 2). Each roller 30 is biased downwardly toward deck 12 by a small spring 32 having one end thereof bent at a right angle and secured to top panel 13, while the free end of the spring bears against the top of roller shaft 30. A small set screw 33 engages a central portion of each spring 32 and is adjustable to permit the biasing force exerted by the springs to be varied as desired. Rollers 30 bear against the upper surface of an inserted card 16 directly above each magnetic head unit 26 to assure that the lower surface of the card is maintained in continuous contact with each tape head 27.

The magnetic cards 16 that are used with the device preferably comprise a thin bottom layer of ferromagnetic oxide fabricated on a tough polyester backing. The particles of the oxide layer can be aligned by a magnetic field, and the tape heads 27 are thus able to record on the card and also to reproduce data previously recorded thereon. A dashed line 16a (FIG. 1) is imprinted near one corner on the upper surface of card 16 to indicate how much should be removed in order to maintain a permanent record. If it is desired to permanently retain information recorded on a card, that corner of the card can be clipped along line 16a to prevent the card from being re-recorded, as will be explained in more detail.

Referring now to FIG. 3, a pair of thin spaced apart carriage brackets 35 and 36 extend longitudinally within housing 11 substantially the entire length thereof. A pair of horizontally turned lugs project from each vertical bracket 35 and 36 to receive screws 37 and to facilitate the mounting of the brackets to the bottom of deck 12. As will be seen, the spaced apart brackets are generally parallel to one another and operate to support a drive belt mechanism therebetween to assist in transporting the card on deck 12.

The drive belt mechanism includes an endless flexible belt 38 that is trained around a pair of rollers 39 and 40 located near the opposite ends of the housing. Roller 39 is freely rotatable about a shaft 41 (FIG. 5) which is mounted between brackets 35 and 36 by screws 42 (FIG. 3). Roller 40 is likewise rotatable about a shaft (not shown) and similarly mounted between brackets 35 and 36 by screws 43. The central portion of each roller 39 and 40 is cylindrical and is provided with a plurality of teeth 44 (FIG. 5).

The flexible belt 38 is preferably impregnated with polyurethane fiber to improve its durability and functional characteristics. The outer surface of the belt is provided with a plurality of small longitudinal ribs 45 (FIG. 2). The interior surface of belt 38 has transversely oriented teeth 46 (FIG. 5) that mate with the teeth 44 of rollers 39 and 40. Accordingly, rotation of the drive rollers rotates belt 38 therewith.

An integral lug 47 projects outwardly from the exterior surface of the belt 38 with the forward surface of lug 47 being flat in order to engage the inner end of an inserted card 16 and to drive the card out of slot 15. The rear (non-card contacting) surface of the lug is preferably of curved shape. A longitudinal opening 48 is formed through deck 12 at a location directly above the upper run of belt 38 to accommodate the rear to front movement of lug 47 above the upper surface of deck 12 as the belt is driven. When necessary, the upper panel 13 may be recessed at 13a (FIG. 1) to accommodate lug movement.

Figure 5:
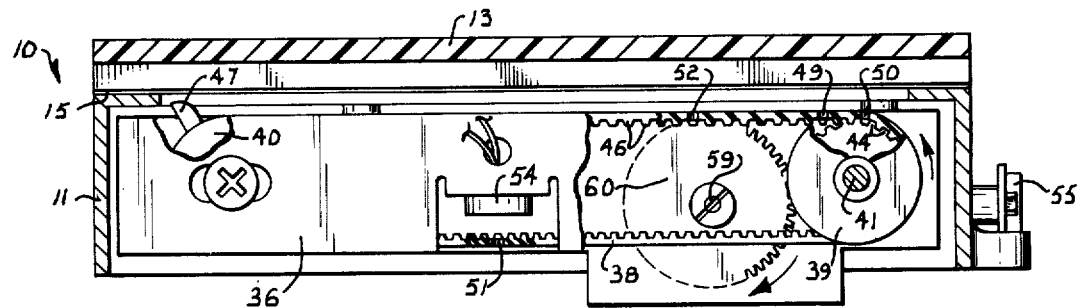
FIG 5 is an enlarged sectional view of the carriage assembly taken along the line 5—5 of FIG. 3 in the direction of the arrows.

With reference to FIG. 5, belt 38 is provided with four apertures which are designated by numerals 49, 50, 51 and 52 and which are selectively spaced relative to one another and to lug 47. A plate-like bracket 53 (FIG. 3) is bent at 90 degrees from bracket 36 at a location slightly above the lower run of belt 38. A conventional photoresistor 54 (V-601 in FIG. 8) is mounted to bracket 53 and is oriented to face downwardly. A light source, preferably an incandescent bulb (DS-201 in FIG. 8) is located directly below photoresistor 54 and beneath the lower run of belt 38. Accordingly, when one of the apertures 49 through 52 is aligned below photoresistor 54, the photoresistor will receive light from the light source, and the later described circuitry will be activated in accordance with the position of the belt. However, general opaqueness of belt 38 prevents photoresistor 54 from receiving light unless one of the apertures is located between the light source and the photoresistor.

A terminal unit (or interconnect) 55 having a plurality of electrical terminals is mounted to the back side of housing 11. In this manner electrical wires including 54a leading from photoresistor 54 connect to selected terminals of the unit 55 in a convenient and space saving manner.

The belt mechanism is driven by a DC motor 56. The base of motor 56 is provided with a pair of lugs which are secured to bracket 35 by a pair of small nut and bolt assemblies 57. The motor is located within a rectangular motor housing 58 formed integrally with housing 11 on one side thereof. The wiring 56a for motor 56 connects to selected terminals of terminal unit 55.

The drive shaft of motor 56 is preferably stepped down through a series of step down gears (not shown) to ultimately drive a shaft 59. A large gear 60 carried on the end of shaft 59 mates with and drives a smaller gear 61 (FIG. 3) which is integral with roller 39 on the end thereof. Motor 56 rotates the gears in the direction indicated by the arrows in FIG. 5, and belt 38 is thus driven forwardly so that its lug 47 engages the end of an inserted card 16 to move and eject substantially all of the card from slot 15.

With reference to FIGS. 2 and 3 in particular, a switch 63 is mounted to a U-shaped bracket 64 formed on the end of panel 36. The switch mechanism 63 includes an elongate microswitch actuator 65 which is normally open. Actuator 65 projects upwardly from the side of switch housing 63 through a rectangular opening 66 formed through deck 12 and top panel 13. The wiring 63a for the switch connects to selected terminals of the terminal unit 55. When a card 16 is fully inserted in slot 15, the card will push actuator 65 against its contact to close the switch and permit the later described circuitry to be activated. However, if the card is not fully inserted, the switch will remain open and preclude the activation of the circuitry, as will be explained in more detail.

Panel 35 also has a U-shaped bracket 67 formed on its end to support a second switch 68. The switch mechanism 68 includes a normally open switch actuator 69 which projects upwardly from the side of 68 through an opening 70 formed through deck 12 and top panel 13. The wiring for this switch also connects to selected terminals of unit 55. When a card 16 is inserted in slot 15, the corner adjacent the dashed line 16a of the card will engage actuator 69 and push it against its contact to close the switch and permit the circuitry to operate in its record mode, as will be explained. However, if dashed line 16a has been clipped to remove the corner of the card, the switch will remain open and the record mode of the circuitry cannot be activated.

Figure 6:
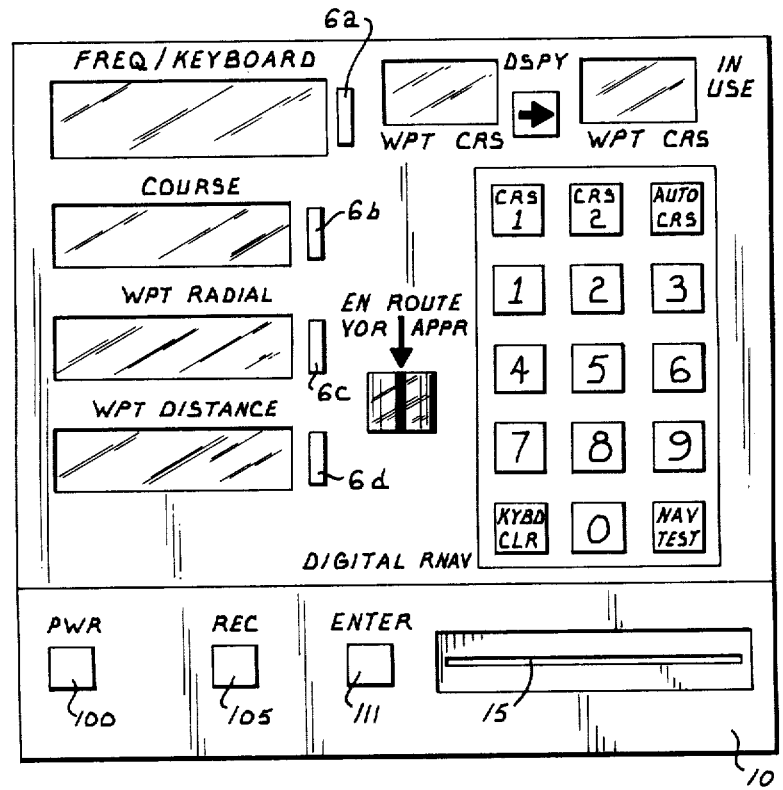
FIG. 6 is a front end elevational view of the combined automatic data input/output system (card reader) and the digital control unit for an RNAV avionics system.
Figure 7:
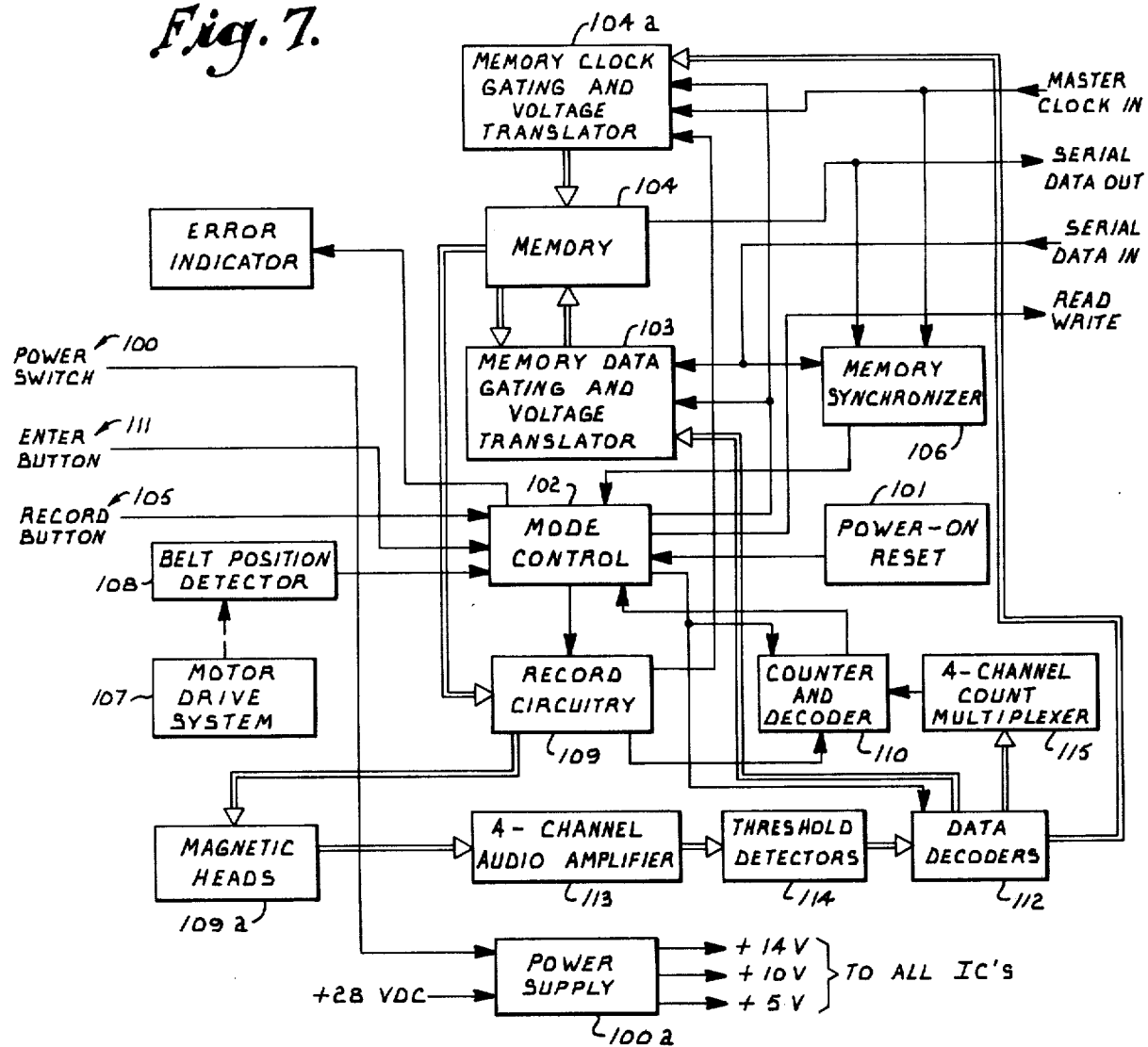
FIG. 7 is an operational block diagram of the automatic data input/output system with certain inputs and outputs being indicated as being directed to the digital control unit.
Figure 6A:
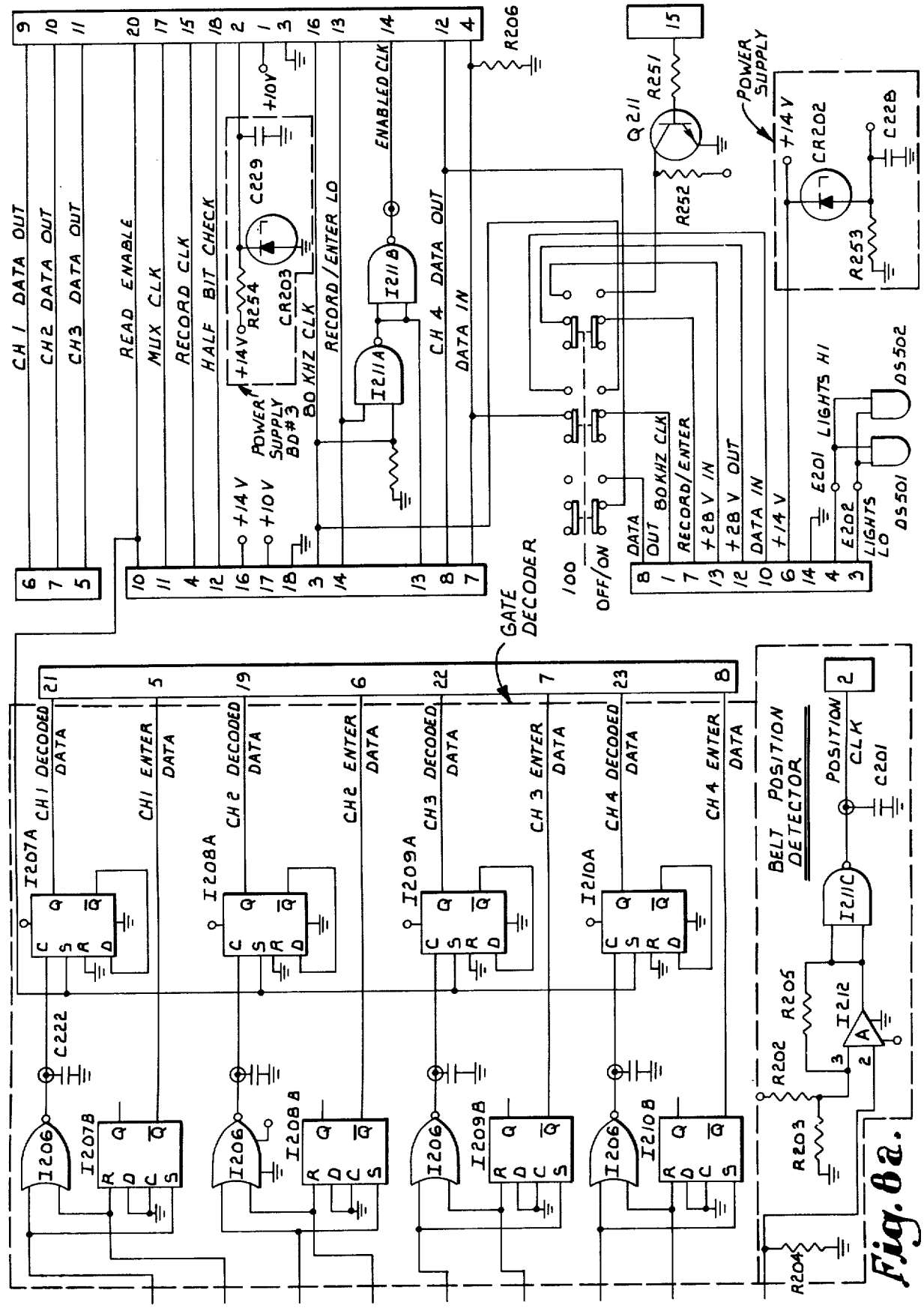

Turning now more particularly to the block diagram shown in FIG. 7, power is supplied to the unit by depressing the power switch 100 on the front panel (FIG. 6) of the unit. The power supply 100a takes the incoming +28VDC from the aircraft power line and series regulates it down to 3 voltages, e.g., +14VDC, +10VDC and +5VDC, which are displayed throughout the system. The power-on reset circuitry 101 senses the rise in voltages immediately after the power switch has been depressed and sets the mode control circuitry 102 to the MONITOR MODE.

The system is in MONITOR MODE whenever power is applied and no commands to Record or Enter have been given. In this mode, the mode control circuit 102 instructs the system to accept the serial data from the digital control unit (KCU-565, supra), gate it through the Memory Data Gating and Voltage Translator Circuit 103 and injects it into memory 104. The memory 104 is clocked (through the memory clock gating and voltage translator 104a) in this mode with the master clock (see upper right hand portion of the figure) from the digital control unit. Hence, in this mode, the memory 104 is a mirror image of the digital control unit memory with the memory being updated every 11.3 milliseconds.

The RECORD mode is activated when the pilot has manually set waypoint data into the digital control unit memory and wishes to record it on the magnetic card. When the record button 105 is pushed, mode control circuit 102 sets itself to the RECORD MODE. This occurs after mode control circuit 102 receives a "go ahead" from the memory synchronizer 106 which insures that the memory data (which is being serially refreshed at the time the RECORD button 105 is pushed) is in a known set of memory locations.

Upon being set to the RECORD MODE, the mode control 102 disables all clocks and data to memory 104 temporarily "freezing" it. The motor drive system 107 is actuated and the magnetic card begins to travel out of the card slot. After sufficient time has been given to the card to build up speed, the drive belt position detector 108 notifies mode control 102 that everything is ready for a recording and the record circuitry 109 is enabled. A low frequency clock, clocks the four channels of the memory. The record circuitry 109 accepts data from memory 104 (four bits at a time), encodes it, and drives the magnetic heads 109a to write the data on the magnetic card with counter and decoder 110 advancing one count each time a set of four bits is recorded. When 256 counts are reached, the data has all been recorded and counter-decoder circuit 110 notifies mode control circuit 102 to terminate the RECORD MODE and the system returns to the MONITOR MODE.

The ENTER MODE is activated when the pilot wishes to read a set of data from a card and enter it into the digital control unit. Activation of enter button 111 sets mode control 102 to the ENTER MODE. Memory 104 is again removed from the MONITOR MODE, however, this time a not in synchronization with the memory synchronizer 106. Motor drive system 107 is started and the card travels outward. When the magnetic card reaches a point shortly prior to where data recording began, the belt position detector 108 notifies the mode control 102 to enable all enter circuits. The memory clocks and data are gated to accept clocks and data from the data decoder circuitry 112.

The magnetic heads 109a now read the data from the card with the data being organized in four separate channels as mentioned above. Each channel is amplified in the four channel audio amplifier circuitry 113. The outputs therefrom are fed to the threshold detectors 114 which convert the analog data to digital outputs. The digital outputs are then routed to the data decoder circuitry 112 which processes each bit determining whether it is a 1 or a 0 and generates a clock to enter the result into the correct memory channel. The four channel count multiplexer 115 gathers the counts from all four channels into one count output eliminating the need for four separate counters. The counter and decoder circuitry 110 keeps track of the bits thus determining if any bits have been lost due to system errors or gained due to noise.

When the magnetic card has travelled past the end of the data tracks, belt positioner detector 108 commands mode control circuitry 102 to go to the next phase which is the ERROR CHECK phase. At this point, the mode control circuitry 102 examines the counter and decoder 110 output to determine if four times 256 or 1024 bits have been counted. If the count is correct, mode control 102 gates the master clock to memory 104 and actuates the read/write line to the digital control unit, thereby entering the output of memory 104 into the digital control unit memory. At the completion of this cycle, the automatic data input-output system returns to the MONITOR MODE.

If it is assumed that the counter decoder output 110 indicates an error has been made, the mode control circuit 102 sets off the error indicator (a flashing red light described later) and returns the unit to the monitor mode. No attempt is made to enter data into the digital control unit and the data read from the card is essentially discarded. The ERROR MODE will be terminated if another attempt is made to enter or record unless another error is detected in the ENTER mode.

Turning now more particularly to the operation of the device into the more detailed schematics, as suggested above, power is applied to the unit by the activation of the push button switch 100 on the front panel of the unit (FIGS. 6 and 8a). This switch connects the four lines used for communication between the auxiliary unit card reader circuitry (the automatic data input/out system) and the digital control unit and applies +28VDC to the power supply filter circuit shown in FIG. 7a. The 28 volt DC is passed through the filter system comprised of capacitors C-301, C-302, C-303, inductor L-301 and diode CR-301. The zener diode CR-301 is used to protect the system against large voltage transients that occur on aircraft power lines due to starting engines, etc. The transistor Q-301 is used in conjunction with the comparator circuit I-301 to series regulate the +28 volts down to a +14 volts. Resistors R-303, R-302 and R-305 form a voltage divider from the +14 volts to ground. The wiper arm of resistor R-302 essentially senses a portion of the +14 volts and routes it back to integrated circuit I-301, as a feedback signal. I-301 compares the feedback signal with its internal 7 volt reference and adjusts the base drive to Q-301 (via pin 6) until the emitter of transistor Q-301 is approximately a +14 volts. Resistor R-304 is employed as an over-current sensor, so that, if current drawn from the +14 volt line exceeds 1.5 times its nominal value (160 ma), I-103 will begin to bias Q-301 so that the +14 volt line is lowered. Further current increases or a short circuit will cause the 14 volt line to ground so that no damage will occur to the power supply.

The 14 volt output from FIG. 7a is routed to FIG. 8a (lower right hand corner) where the zener diode CR-202 and the resistor 253 regulate it down to +10 volts. As further shown in FIG. 8a, resistor R-254 and diode CR203 also regulate the 14 volt down to 5 volts so that a +10 volt DC and a +5 volt originate from this circuit and may be channeled throughout the system wherever needed.

In addition to the power supply, the +28 volts coming from the front panel switch 100 is fed to light bulb B-201. This light bulb provides a light source under the belt (38) that effects the movement of the magnetic card 16 from the above described card slot. As suggested above, the photoresistor V-601 is located on the opposite side of belt 38 so that as the belt turns during a RECORD or ENTER cycle, the small holes 49, 50, 51 and 52 in belt 38 allow light to shine on the photoresistor at certain positions of the belt.

As the power supply output voltages are applied to the system (and the associated integrated circuits powered up), R-103 begins to charge capacitor C-101 (see FIG. 9). The time constant associated with this charge is rather long compared to the power-up time (approximately 100 milli-seconds). Therefore, for about 50 milliseconds after power-up, a low threshold voltage is applied to the gates I-101B, pin 5, I-101C, pin 12, I-116B, pin 4, I-101A, pin 2, and I-117B, pin 5. This forces the reset pins of all the mode control flip flops: I-102, I-103, I-104; high for 50 milliseconds. When capacitor C-101 becomes charged so that TP-120 (see upper left corner of FIG. 9) is above 3 volts, the reset command disappears, leaving the mode control flip flops (I-102 through I-104) in the reset state. Capacitor C-101 will stabilize at 10 volts and remain there for as long as power is applied to the unit.

Until a pilot command is given, all mode control flip flops (I-102 through I-104) are in the reset state which corresponds to the MONITOR MODE condition. Both Q outputs of flip flops I-102A and I-102B are low, thereby forcing the node TP-101 (FIG. 9a) high through the gate I-119A. This, in turn, holds the system counter I-106 in a disabled state to insure that it is set at zero count when it is ready for use.

The line labelled REC/ENT (record/enter) LO is routed out of the node TP-101 (FIGS. 9a and 9b) to FIG. 8a where it enables gate I-211A and allows the 80 Khz clock coming in to enter the system. The REC/ENT LO and the enabled clock (80 Khz) are both routed to FIG. 10 where the enabled clock is gated through I-406A, B and C and I-408B to clock the four serial memory chips I-402, I-403, I-404 and I-405, respectively. The REC/ENT LO line delivers a high to the KA pin of the integrated circuit gating chip I-401 thereby gating all A inputs to their corresponding "D" outputs. This operation effectively feeds the "Data In" line coming in from the digital control unit (KCU-565A) to the input of the first memory chip and conects the four memories, I-402 through I-405, into a serial configuration. The data inputs and clocks to all the memories are synchronous with the memorys of the digital control unit so that the data being stored is a mirror image of that in the digital control unit.

There are 904 bits of storage in the digital control unit and 1024 bits in the automatic data input/output system (ADIOS) so some of the data in the ADIOS will be redundant data. However, this redundant data is recorded and reproduced along with the rest of the data but it is eventually discarded.

The resistor-diode combination (R-401 - R-404 and CR-401 - CR-404, FIG. 10) preceding each input stage to the shift-register memories, I-402 – I-405, is used to translate the 10V-ground logic levels of COSMOS chips to the 10V–5V level needed for PMOS memories.

The serial memory in the digital control unit is organized such that 6 consecutive 1's are placed two bits prior to the beginning of a data cycle. These 6 1's (highs) are sensed and used as a reference pulse. The ADIOS must also sense this sync group so that the unit will know where the data is positioned in the memories at various times. This function is accomplished, in part, by the registers and gates I-108, I-109A and B, and I-120D (FIGS. 9 and 9a) which form a portion of the memory synchronizer 106 (FIG. 7). Pin 10 on flip flop I-121B is high in the monitor mode forcing the flip flop to the reset state and allowing the data-in from the digital control unit to be gated through I-119C and I-107D to the data input of the register I-108. Register I-108 is clocked synchronously with the memories using the "enabled clock" signal. The six outputs of shift register I-108 are fed to the gates I-109A and B. When 6 consecutive 1's have been shifted into register I-108, the outputs of the gates I-109A and B (pins 1 and 13) will go low and the output pin 11 of gate I-120D will emit a pulse that lasts for one half of the 80 Khz clock period. This is the reference pulse and it marks the end of a data cycle and occurs two clock periods before the beginning of another data cycle.

RECORD MODE

Assume first that a program has been loaded into the memory of the digital control unit and that the pilot now wishes to record the program on a magnetic card. Power has been applied to the card reader and recorder and the unit is currently operating in the MONITOR MODE as described above. The pilot inserts the card into the slot that will be conveniently marked. The RECORD button 105 (FIG. 8) is now depressed and the switch output is forced to ground. The output travels to the carriage interconnect (55) and through microswitches 63 and 68 mounted in the carriage. If a corner has been clipped from the card as suggested above to indicate a permanently stored card, switch 68 is open and the record operation goes no further. However, if the corner is present and the card is fully inserted, the switch is closed. The ground impulse is routed back through the carriage and travels to FIG. 8 as the RECORD LO command. This low is then applied to pin 3 on gate I-119B shown in FIG. 9, forcing the output of same to go high when three conditions have been satisfied. These conditions are:

1. When a RECORD LO line is low;
2. When the motor flip flop I-104B is reset indicating another cycle is now in execution. Pin 5, of I-119B, will be low if this criteria is met;
3. When the above two conditions are met, the RECORD cycle is ready to begin. Pin 4 of I-119B is fed an inverted version (through inverter I-107A, FIG. 9A) of the sync pulse discussed above from pin 11 of the gate I-120D. Hence, when the data is correctly positioned in the memories, the sync pulse is delivered to gate I-119B and its output goes high.

The high output from the Gate I-119B simultaneously sets the flip flops I-102A, I-104A and B (through inverter I-118C and gate I-117A) and resets I-103B (through inverter I-118C and gate I-116B), the latter being the error indicator flip flop. If I-103B had been set due to an error in the previous ENTER MODE, the ERROR MODE is now cleared. Further, the output pin 1 (the Q output) of flip flop I-102A (FIG. 9) goes high, forcing the output (FIG. 9a) of gate 119A (the REC/ENT LO line FIG. 9b) low. This removes the high that existed on reset pin 11 (through resistor R-122) of the register I-106 shown in FIG. 9. Accordingly, the system counter is now ready for use.

The REC/ENT LO line is also routed to FIG. 8 where it disables gate I-211A cutting off the clock (80 Khz) to the memories, I-402 – I-405, located in FIG. 10a. The data is "frozen" temporarily in the position where it was when the sync pulse was generated. The REC/ENT LO line is also routed directly to FIG. 10 (upper left) where it releases the memories from their serial configuration by disabling a portion (*ka*) of the gating chip I-401. The memories are now filled with the data that was last monitored and their (the memories) gating modified so that now they may be treated as four independent channels.

As was noted with respect to FIG. 9, the flip flops I-104A and B were set along with the flip flop I-102A. The $\overline{Q}$ (pin 2) output of I-104A goes low which sends a "begin erasing" command to the system. This line 100L removes the reset condition that hadd been imposed on flip flops I-110A and B and flip flops I-111A and B which form a portion of the Record Circuitry and which output the various channels record data.

As shown in FIG. 8, the Erase Lo line also is inputted at the left side gates 201A, B, C and D and applies a +10 VDC to the collector-resistors of transistors Q-203 through Q-210 via transistor Q-201. As will be seen, these transistors provide a substantial portion of the recording system.

At this time it should be remembered that the mode of flip flop I-104B has also been set (see FIG. 9). The $\overline{Q}$ output pin 12 from the flip flop I-104B goes low and accordingly cuts off the two transistors Q-102 and Q-103 (FIG. 9a). This saturates the third transistor Q-101 providing a +14VDC to the motor drive line which will be inputted to FIG. 8 and out to the carriage assembly. The motor 56 drives belt 38 and in turn begins to push the magnetic card out of the slot.

As suggested above, belt 38 has four small holes (or apertures) located therein at various points which allow light to shine therethrough from the bulb B-201 and to impinge upon the photoresistor V-601 that is mounted in the carriage assembly. This photoresistor acts in conjunction with resistor R-204 (FIG. 8a) as a voltage divider. When the light shines on the photoresistor, the voltage presented to the input pin 2 of I-212A exceeds the reference at the other input pin 3 thereof. The gate I-212A changes state and likewise causes the output from gate I-211C to change state thereby providing a signal which may be referred to as the Position Clock which is inputted to FIG. 10, the C input pin 9 of the execute enter flip flop I-105A on FIG. 9. Every time the light shines on the photoresistor, flip flop I-105A is clocked, shifting another high from its D input to the register. For example, the first light pulse shifts a high into the output pin 5 of I-105A. This is ignored in the RECORD MODE as the gates I-122A and I-116A (FIG. 9a) are disabled by the output pin 13 of I-102B (the execute enter flip flop) being low. The second light pulse shifts another high into the register I-105A causing pin 4 to go high. Gate I-122B has been enabled by flip flop I-102A in this mode and the output from I-122B (RECORD/ENABLE) goes low. This notifies the system that the card has built up speed and is ready to have a recording made thereon.

The two gates I-120A and I-120B form a ½ - duty cycle oscillator used for recording. When the RECORD/ENABLE line goes low, the oscillations from I-120A and I-120B begin. During the RECORD portion of the oscillator cycle, data is recorded upon the card but, as suggested above, during the erase portion the system erases any previous data on the card while advancing the memories (I-402 – I-405, FIG. 10a) one count to position the next data bit for recording. The memories are clocked by a buffered differentiation of the negative edge of the output from gate I-120C which is inputted to the memory clock gating and voltage translator circuit on FIG. 10. The system counter is advanced one count each time the memories are clocked (I-120B clocks I-106 through I-115A, FIG. 9).

As may be seen, the gates I-107E and I-107F form the erase oscillator in conjunction with the flip flop I-121A; the combined flip flop I-110A, I-110B, I-111A and I-111B, and gates 112A-D, 113A-D and 114A-D form the record wave forms. At this time it is helpful to refer to the wave form diagrams, FIGS. 14, 15 and 16, and likewise to FIGS. 9a and 9b. The channel 1 record data output is shown as appearing on the Q line or pin 1 of flip flop I-110A. Since all handling of channels 1, 2, 3 and 4 is similar, the discussion will be limited to an explanation of the operation of the combined record and erase features with respect to the channel 1 data.

To restate some discussion mentioned above, the record clock essentially emanates from the gates I-120A and B, while the erase frequency oscillator is made up, in the main, by the gates I-107F and I-107E. The output from the erase frequency oscillator (33 Khz) is delivered to the record circuitry which will include the above mentioned gates and flip flops and which effect the record wave forms. The output from the erase oscillator (33 Khz) is delivered through NAND gate I-113B to flip flop I-110A which essentially operates to divide the 33 Khz by 2 so that the output on the $\overline{Q}$ pin thereof is approximately 16.5 Khz. This 16.5 Khz $\overline{Q}$ pin 2 output is then inputted to the exclusive OR gate I-112B. However, the only time that the exclusive OR gate I-112B will have an output therefrom is when the input on pin 5 is different from that on pin 6. In the erase mode, even though there may be an output from I-112B, pin 4, it is applied to the input of gate I-113A which will not be enabled during the erase portion of the cycle so that the output from the exclusive OR circuit I-112B has no effect on the circuit's operation at this time. Because gate I-113A is not enabled, its output is high, which enables the gate I-113B and permits the erase frequency to pass through I-113B and to clock flip flop I-110A.

As also suggested above, the only time that data will appear on the data out lines in when a sync pulse arrives from the record clock. At that time, the sync pulse will be derived from the Q output on flip flop I-121A, pin 1, which will go high. This high output then is delivered to the gate I-113A and enables same so that the output of the exclusive OR circuit I-112B is then gated onto I-113B. Stated another way, the output of exclusive OR I-112B will be high only if the $\overline{Q}$, pin 2, output of the flip flop I-110A is different (the complement) than the data which is the other input to the exclusive OR circuit. At this time, it should be remembered that the Q output of I-110A will be essentially the same as the data input. The output of the exclusive OR I-112B now being high and the sync pulse being high, forces the output of the gate I-113A low. This disables the erase frequency from entering the NAND gate I-113B and results in the clock line to I-110A being forced high and remaining there due to the operation of the exclusive OR gate I-112B. In other words, the Q output from the flip flop I-110A becomes essentially the same as the data and if the data contains a 1, a 1 will be outputted on the channel 1 record data line. Likewise, if the data contains a 0, a 0 is outputted on the channel 1 record data line.

At this time, it is helpful to review the theory of magnetic card recording. The magnetic cards to be used with the subject invention is comprised of a thin layer of ferro-magnetic oxide fabricated on a tough polyester backing. The oxide layer possesses the property necessary for recording in that its constituent microscopic particles can be aligned by a magnetic field. This alignment will remain upon removal of the field until realigned by another field. The particles now generate their own characteristic fields which can be sensed and interpreted. When current is driven through a magnetic head, a flux is generated in the magnetic core with the amount generated being proportional to the current in the coil. This flux "sees" a low reluctance path in the core and a high reluctance path across the air gap. If the magnetic card is brought into close proximity with the air gap, the flux will see the oxide layer as a path of lower reluctance in the air gap and complete its path through the oxide layer. The magnetic field associated with this flux aligns with the oxide particles. When the field is removed, the particles stay in this alignment. If the magnetic head is again brought by the area of particle alignment, this time with no current being driven into them, the field of the oxide particles will induce a voltage in the head windings defined by $E + N (d\phi/dt)$. Hence the voltage is the time derivative of the flux (as the head moves from one data bit to another) times the number of turns in the head winding.

If current is rapidly switched through the magnetic heads from one direction to another, an erase effect occurs. Flux is written in one direction while an area of the card is under the air gap. As the card travels forward, current is switched to the other direction while the area is still within the field range of the air gap and the written flux is substracted from. If the current is rapid enough in its changes so that several changes occur while the area under consideration is within field range of the air gap, the flux appears to decay with the net effect being an indeterminate state of field particle alignment, e.g. the area has been erased.

The subject invention employs the above described record scheme that eliminates the traditional need for erase heads. The data is written during one third of the record cycle oscillations while during the other two thirds, a high frequency erase signal is applied to the heads which erases any data previously written on the card.

Returning once again to the RECORD mode circuit mentioned above, each channel takes the erase frequency at the output of I-107E, synchronizes it with the record oscillator, and latches to one state or the other depending upon the data bit. (See FIG. 15 for a typical channel.) The outputs (for example, channel 1 record data) are fed to the circuit shown in FIG. 8 where each channel is routed to a head driving circuit. Channel 1 RECORD DATA is channelled to the base driving resistor of transistor Q-203, inverted and fed to transistor 204 in a similar manner. Transistors Q-203 and Q-202 operate in a complement mode to drive current in one direction or another through the head. The rise time of the current through the head is determined approximately by L/R where L is the inductance of the head and R is the 1.5 Kilohm resistor.

The record oscillator, I-120A and I-120B, continues to write data bits advancing the memory shift registers one bit after each bit is recorded. This continues until I-106 (FIG. 9) has received 256 counts signifying that all data has been written. After the 256th bit is recorded, pin 12 of I-106 goes high forcing the output from the gate I-118E to a low condition. This resets the flip flop I-102A through gate I-101B. Output pin 1 of the flip flop I-102A goes low causing RECORD/ENABLE (the output from I-122B) to go high turning off the RECORD oscillator. However, the erase flip flop, I-104A, is still in the set state. The head therefore continues to erase out past the end of the data track almost to the end of the card. When I-102A goes reset, REC-/ENT LO returns to a high state resetting the system counter I-106 gating the "Enabled Clock" back to the memory chips and reconnecting the memories in the serial or MONITOR mode.

The motor will continue driving the card out until only a small portion remains within the slot. A third light pulse occurs on the photoresistor when the card has nearly fully emerged and I-105A is clocked a third time. This (the pulse on the "position clock" line) causes the output pin 3 on I-105A to go high which is ignored since I-116A (error check gate) is disabled in the record mode.

The belt continues traveling around until it approaches the point where rotation originally began. However, it will first allow the fourth light pulse to clock I-105A forcing its output pin 10 high. The output of gate I-122D goes low and applies same to the input of I-117B and to the gates I-101A-C. This insures that every mode control flip flop (except I-103B) is reset. The erase flip flop I-104A terminates the erase commands to the heads and the motor flip flop I-104B shuts down the motor. Transistors Q-102 and Q-103 act as a dynamic breaker discharging the motor winding field through transistor Q-103 and preventing "coasting" of a motor. The data has now been broken down in the four channels and recorded on the card and the unit returns to the monitor mode awaiting further commands.

ENTER MODE

Once a program has been recorded onto a magnetic card it may be inserted at any time to the card reader and the resulting operation may be conveniently referred to as an Enter Mode.

a card is inserted in the card slot in a manner similar to the Record Mode, however the pilot or operator now depresses switch 111 (the enter) button. The output from 111 goes to ground and is routed to the carriage via the carriage interconnect where it travels to the second microswitch. If the card is not fully inserted (engaging the microswitch) the command goes no further. If the microswitch is closed, the ground impulse goes back to FIG. 8 of the circuit board where it is then channelled to FIG. 9 as the ENTER LO signal. The ENTER LO signal forces the outputs of I-118A, I-116B and I-117A high setting the "Execute Enter 1" and the "Motor" flip flops, I-102B and I-104B, respectively, and resetting the Error Indicator flip flop I-103B. The Enter Mode may then be considered as divided into two phases, enter 1 and enter 2, with the enter 1 mode having now been initiated.

It is significant to note that there is no need for synchronization with the memory in this mode since the data and the memories will soon be replaced with the data from the card. The Q output, pin 13, of the flip flops I-102B will now go high causing the REC/ENT LO line to go low. Just as in the Record Mode, this removes the reset command from the system counter, disables the 80 Khz clock to the memories, and pulls the memories out of the serial configuration. The output from I-102B also enables I-122A and I-116A when it goes high. This will allow the commands generated by the position clock for the Enter Mode to enter the system. It should be noted that the I-122B (Record Enable Gate) is disabled during this mode.

Motor flip flop I-104B has been set turning off transistors Q-102 and Q-103. Transistor Q-101 goes into saturation again, activating the motor and the card will travel forward as it is driven by the belt drive.

It should be remembered that in the Record Mode the first light pulse was ignored and the second light pulse was used for Record Enable. In the Enter Mode, the first light pulse was used for Read Enable. This insures that Read enable always gets activated prior to the point where data recording begins. (See FIG. 16). On the first position, clock output I-105A shifts a high onto its pin 5 thereof. This causes the output of gate I-122A to drop low and corresponds to the Read Enable command.

The Read Enable line is inputted to FIG. 8a where it removes the "set" command that has been applied to I-207A, I-208A, I-209A and I-210A. These chips form an integral part of the data decoder circuit and have now been freed for use. The Read Enable line also goes to FIG. 10 circuitry where it is inverted and fed to pin 14 (kb) of I-401. This permits all of the B inputs of I-401 to be routed to their corresponding D outputs. (Similarly, a pulse on the ka input of gating chip I-401 permits all A inputs to I-401 to be routed to the corresponding D outputs.) The outputs of each channel's decoder circuit have now been effectively routed to a memory chip data input.

Shortly after the operation described immediately above, the data on the magnetic card starts to pass the magnetic head. A typical channel, channel 1, may be reviewed since all channels are identical in their data reproduction process. (Also note FIG. 16) In the example, transistors Q-203 and Q-204 (FIG. 8) are cut off in the Enter Mode. The magnetic head is DC biased at 5VDC through resistors R-211 and R-212 from transistor Q-202. Data from the card induces AC voltages in the magnetic head that are amplified by I-202A. Capacitor C-204 acts as a high frequency attenuator to increase the noise immunity of the system. (Again, reference may be had to FIG. 16 and note that a logic 1 is reproduced as a positive voltage pulse followed by a negative and a logic 0 is a negative voltage pulse followed by a positive).

Circuits I-204A and B act as positive and negative threshold detectors. Resistors R-235, R-236, R-237 and R-238 form the DC reference values. R-235 is fed a highly stable noise-free 13VDC. At the junction of R-236 and R-237, a 6.5VDC is located, and is fed to circuits I-204A and I-204B through resistor R-239. Data from I-202A is capacitively coupled to the same point resulting in data being superimposed on 6.5VDC. I-204A has its other input, pin 2, being fed 6.8 volts through resistor R-240 while I-204B, pin 5, has a 6.2 voltage delivered thereto through resistors R-241. When the data exceeds 0.3 volts in a positive direction, the output of I-204A goes high until the data returns to a value of less than 0.3 volts. When the data drops below 0.3 volts in a negative direction, the output of I-204B goes high until the data returns to greater than −0.3 volts. This is the point where analog data is converted into digital logic.

From here the data goes to the decoding circuit comprising I-206A and I-207A and B. I-206A is an inverting OR gate and operates at the end of either a negative or a positive pulse to clock I-207A which is a divide by two circuit. At the beginning of the ENTER cycle it is in the "set" state (pin 1 is high). Every two pulses from I-240A and B returns it to the "set" state. Assuming that the first data bit from the magnetic head was a logic 1, two pulses will essentially emanate from I-204A and B, then a positive pulse from I-204A is followed by a negative pulse from I-204B. The pulse from I-204A sets I-207B and clocks I-207A. The pulse from I-204B resets I-207B and clocks 207A again.

The pin 1 output from I-207 goes high, firing a one shot multivibrator I-413A and B on FIG. 10. When the one shot times out, it clocks the channel 1 memory chip (I-402, FIG. 10a) through I-406B. The data input to the memory at this time is the last state of the Q̄ output from I-207B which is high for a logic 1 from the card. Hence, a "1" is shifted into the memory. For a logic 0 the operation is identical except that I-207B is reset-set presenting a "0" to the memory when the one shot clocks it.

The four channels fill their corresponding memory chips with data, however all channels are independent of each other. FIG. 10 includes a multiplexed counter which allows the system to count the bits in all four channels with only one counter. The system will therefore know if any bits are missing or if noise has added bits. I-407 is a "strobe generator" that rapidly shifts a 1 through its four stages. This pulse travels at an 80 Khz rate compared to the 1 Khz rate of the data from the magnetic card. Whenever the line from FIG. 8 goes high, the reset command at pin 4 on flip flop I-410A is removed. The first time the circulating 1 in I-407 moves from pin 5 to the next stage, I-409A clocks I-410A which "sees" a high on its D input, pin 5. Pin 1 of I-410A (the Q output) goes high, disabling gate I-409A to prevent further strobes from coming in. The capacitor-resistor combination C-401 and R-417 feed a differentiated "spike" to I-412B causing a narrow pulse to appear at its output. When "CH 1 Q" goes low again, flip flop I-410A is reset and waits for another cycle the next time that "CH 1 Q" goes high. The circulating 1 from I-407 strobes all four channels sequentially forcing a pulse to appear at the output of I-412B whenever a channel indicates a data bit has been read from the card. This technique will account for all possible data errors except when only one pulse enters the system due to noise. (This will result in I-207A, I-208A, I-209A or I-210A, (FIG. 8a) ending up in the reset state at the end of the data reading.) I-412A checks for this condition with the output pin 1 from I-412A being low if same has occurred.

The output from the ½ bit check gate I-412A and the output from gate 412B (pin 13) are fed to FIG. 9 on the MUX CLK line and enter the system counter, I-106. If each channel has been read correctly, MUX CLK will have clocked I-106 through I-115 1024 times which corresponds to four times 256. Pin 15 on I-106 will go high and if the count is correct and the ½ bit check line is high, output pin 4 on gate I-115B will go low indicating that everything checked out correctly.

As the magnetic card moves the end of the data track past the magnetic head, a third hole in the belt causes the position clock to clock I-105A a third time. At this time, the output pin 3 on I-105A goes high and the output pin 9 on the error check gate (I-116A, FIG. 9a)

will go low as soon as the 80 Khz clock applied thereto goes high. This merely insures that the error check command is synchronous with the digital control unit as the next operation may need to be synchronous. For all practical purposes the above ends the "Execute Enter 1" cycle.

The unit will now go to either the Execute Enter 2 mode or the Error Mode depending on whether an error has occurred. If it is assumed that all data has been read correctly and that ERROR OUTPUT (I-115B, pin 4) is low, the low condition on the output of the error check gate I-116A resets I-102B through gate I-101A. When the Execute Enter 1 flip flop I-102B is reset, the REC/ENT LO line goes high again disabling the system counter I-106, enabling the 80 Khz clock to the memories and reconnecting the memories to a serial mode. Error Check simultaneously clocks I-103A and B. The Execute Enter 2 flip flop I-103A "sees" Error Output inverted at its D, pin 5, input and the Error Indicate flip flop I-103B sees ERROR OUTPUT at its D input, pin 9. Since ERROR OUTPUT is low, I-105A goes to the set state and I-103D will remain unchanged. The $\overline{Q}$ output, pin 2, of flip flop I-103A goes low enabling I-105B for use and channelling the "Data Out" going to the digital control unit into the sync pulse generator (I-108A and B, I-109A and B, and I-120D) through flip flop I-121B, gate I-119C, and inverter 107D.

In the meantime, the Q output, pin 1, of the Execute Enter 2 flip flop I-103A has gone high to aid in the controlling of flip flop I-121B for a sync pulse channelling and saturating the transistor Q-211 in FIG. 8a. At this time, the collector of transistor Q-211 goes to ground sending a low on the RECORD/ENTER line to the digital control unit. This line controls whether data is accepted into the digital control unit or not. When the line is low, the data present on the data out line is shifted into the digital control unit memory synchronously with the 80 Khz clock. However, it should be remembered that the ADIOS (card reader) memories are filled with data from a card. Therefore, during the Execute Enter 2 stage, the data is shifted serially through the memory and out into the digial control unit memories.

The sync pulse generator described above monitors the Data Out line. Since Channel 4 had stored some redundant data during record, six highs will appear before the read data is reached after 128 clocks of the 80 Khz clock period. Pin 11 on gate I-120D outputs a sync pulse upon "seeing" the six highs which corresponds to the reference pulse for the redundant data. This clocks I-105D once causing the output pin 13 thereof to go high.

The 80 Khz clock continues to shift the memory's data into the digital control unit. Redundant data is "overflown" in the digital control unit's memories and discarded. At the end of the data (after 1024 clocks) another six highs are encountered on the data output line. These are the reference pulse for the good data. The output pin 11 of the gate I-120D generates another sync pulse clocking I-105 a second time so that its pin 12 goes high forcing pin 4 on inverter gate 107B to go low. After a short delay, input pin 11 on gate I-101C (FIG. 9) goes low resetting the Execute Enter 2 flip flop I-103A. This ends the Execute Enter 2 stage and the REC/ENT line to the digital control unit goes high returning control to the digital control unit with the new data in its memories.

The motor continues to drive the belt until it reaches the fourth light pulse where a position clock clocks 105A a fourth time. I-122D resets all mode control flip flops and the unit returns to the monitor mode.

As suggested above, an error light will be eliminated if an error occurs. If, for example, it is assumed an error was made at the end of the Execute Enter 1 phase in the error mode, if any bits were lost, I-106 was clocked less than 1024 times. Pin 1 will be low forcing error output (pin 4 of I-115B, FIG. 9a) to be high. If any bits were gained, I-106 was clocked more than 1024 bits and on the 125th clock, pin 9 of I-106 went high, resetting the counter through I-115C and D. Pin 15 of I-106 will again force the error output to be high.

When ERROR CHECK occurs, this time it still resets I-102B disabling the system counter, enabling the 80Khz clock to the memories and reconnecting the memories in the serial mode. However, as Error Check clocks 103A and B, the Error Output is such that I-103A remains reset and I-103B goes to the set state. Since I-103A is not set, the data in the memories does not enter the digital control unit. The data is lost since the memories now enter the Monitor Mode again.

The Q output, pin 13, of the error indicate flip flop 103B has gone high in the meantime, enabling the low frequency oscillator comprised of I-117C and I-117D. Output pin 11 of I-117D drives transistor Q-104 (FIG. 9a) through resistor R-114 causing the error light, DS0101, to flash repeatedly. The pilot is warned that an error has occurred and that no data has been allowed to enter the system. The error flasher will terminate upon attempting another RECORD or ENTER mode.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for use in an avionics system, said apparatus mounted within a pilot operated aircraft for processing data on a card, said apparatus comprising:
   a read-write head, and
   means interconnecting said read-write head within said system to permit a pilot to program data on said card, using said apparatus while in said aircraft.

2. The combination as in claim 1 wherein said interconnected means includes a means for reading said programmed data on said card.

3. The combination as in claim 2 including means for utilizing said programmed data for assisting in the navigation of said aircraft.

4. The combination as in claim 2 including means for causing said apparatus to accept serial data from an aircraft navigation device, said serial data corresponding to navigation information,
   a memory,
   means for gating said serial data and injecting it into said memory, and means for clocking said memory with a master clock to automatically update said data in said memory at preselected intervals.

5. The combination as in claim 4 including means for manually selecting said data to be encoded, said memory having different portions therein, means for insuring that data is located at preselected portions of said memory, and means for recording said data located in said memory on said card.

6. The combination as in claim 5 including means for determining when all of said data has been recorded and for terminating the operation of said recording means.

7. The combination as in claim 6 including transport means for moving said card past said read-write head, and means for notifying said apparatus when said card is in a position to be recorded upon.

8. The combination as in claim 7 wherein said recording means includes means for clocking said data located in said memory,
means for encoding said clocked data, and wherein said recording means includes a means for driving said head to read said data on said card.

9. The combination as in claim 8 including means for magnetically writing and erasing data on said card with the same read-write head.

10. The combination as in claim 9 including means for injecting a high frequency bias to said head at preselected intervals so that magnetic erasure is accomplished after a magnetic writing or recording operation.

11. The combination as in claim 9 including switch means for changing modes of operation to permit said apparatus to only read data on said card.

12. The combination as in claim 11 including ENTER circuitry means, and
means for enabling said ENTER circuitry means when said card is located at a preselected position with respect to said read-write head.

13. The combination as in claim 12 including means for initiating the reading of said data from said card by said read-write head.

14. The combination as in claim 13 including means for decoding said data read from said card.

15. The combination as in claim 14 wherein said data is recorded on said card in four separate channels and wherein said apparatus includes four separate read-write heads arranged so that each head reads data from the corresponding data channel.

16. The combination as in claim 15 including multiplexer means for gathering said data from all four of said heads into a single output.

17. The combination as in claim 16 including means for determining if any data has been lost due to system errors or gained due to noise.

18. The combination as in claim 17 including means for transmitting said data, after reading same from said card and checking same for errors, to said navigation utilizing means.

19. The combination as in claim 2 including switch means for changing modes of operation to permit said apparatus to only read data on said card.

20. The combination as in claim 19 including ENTER circuitry means, and
means for enabling said ENTER circuitry means when said card is located at a preselected position with respect to said read-write head.

21. The combination as in claim 20 including means for initiating the reading of said data from said card by said read-write head.

22. The combination as in claim 21 including means for decoding said data read from said card.

23. The combination as in claim 22 wherein said data is recorded on said card in four separate channels and wherein said apparatus includes four separate read-write heads arranged so that each head reads data from a corresponding data channel.

24. The combination as in claim 23 including multiplexer means for gathering data from all four of said heads into a single output.

25. The combination as in claim 24 incuding means for determining if any data has been lost due to system errors or gained due to noise.

26. The combination as in claim 25 including means for transmitting said data, after reading same from said card and checking same for errors, to a means for utilizing said data for assisting in the navigation of said aircraft.

27. The combination as in claim 2 wherein data is mangetically recorded on said card in four separate channels and wherein said apparatus includes four separate read-write heads arranged so that each head reads data from the corresponding data channel.

28. The combination as in claim 27 including multiplexer means for gathering data from all four of said heads into a single output.

29. The combination as in claim 1 including means for magnetically writing and erasing data on said card with the same read-write head.

30. The combination as in claim 29 including means for injecting a high frequency bias to said head at preselected intervals so that magnetic erase is accomplished after a magnetic writing operation.

31. A method for processing data relating to aircraft navigation on a card while located within a pilot operated aircraft, said card being programmable by the pilot while within said aircraft, said method comprising
inserting a card within the operable proximity of a read-write head,
digitally encoding data into an electronic memory interconnected with said read-write head,
moving said card past said read-write head, and
recording said data on said card as said card moves past said read-write head.

32. A method for processing data relating to aircraft navigation on a card located within a pilot operated aircraft, said card being programmable by the pilot while within said aircraft, said method comprising the steps of:
inserting a magnetic card in operable proximity of a read-write head,
moving said card past said read-write head,
reading said data from said card as said card moves past said read-write head, and
utilizing said data read from said card to assist in the navigation of said aircraft.

33. Apparatus for use in an avionics system to record data on a magnetic card and to reproduce data recorded thereon, said apparatus comprising:
a housing defining a slot therein of a size to receive the magnetic card;
a read-write head selectively operable to record data on the card and to reproduce data recorded on the card;

a belt supported within said housing for movement along a preselected path in proximity to said slot and operable to drive the card out of said slot in response to movement of said belt along said preselected path;

drive means for driving said belt along said preselected path; and means for maintaining the card in contact with said tape head means as the card is being driven out of said slot.

34. The combination as in claim 33 wherein said belt includes a projection extending therefrom and positioned to engage said card and to effect the movement thereof.

35. Apparatus as set forth in claim 34 wherein said card maintaining means includes at least one roller element rotatably supported within said housing in opposition to said head on the opposite side of said slot therefrom, and means for biasing said roller element toward said head whereby the card is engaged between said roller element on one side and said head on the other side.

36. Apparatus as set forth in claim 35, including a smooth, flat surface presented at one longitudinal edge of said slot for engagement with one longitudinal edge of a card inserted in said slot, and yieldable means for engaging the opposite longitudinal edge of the card to retain said one edge thereof against said flat surface as the card is being driven out of said slot.

37. Apparatus as set forth in claim 36 wherein said yieldable means comprises a bar extending along the longitudinal edge of said slot opposite from said flat surface at a location to engage said opposite edge of the card, and biasing means urging said bar toward said flat surface to retain the card against said flat surface.

38. The combination as in claim 33 including photoelectric means for determining the position of said belt, said belt position determining means being operable to effect the selective operation of said read-write head.

39. Apparatus as set forth in claim 33 including:

electronic circuit means connected to said head for selectively operating same, said circuit means having a record mode enabling said head to record data on the card and an ENTER mode enabling said head to reproduce data recorded on the card; and a first switch mechanism biased toward an open position wherein the activation of said circuit means is precluded, said first switch mechanism being located adjacent said slot at a position to be engaged and closed by a card fully inserted in said slot to permit activation of said circuit means, whereby the activation of said circuit means is precluded unless a card has been inserted in said slot.

40. Apparatus as set forth in claim 39 including a second switch mechanism biased toward an open position preventing said circuit means from operating in said record mode, and a terminal unit supported on said housing and having a plurality of electrical terminals, said first and second switch mechanisms and drive means all having electrical wiring connected to selected terminals of said terminal unit.

41. Apparatus as set forth in claim 40 including photoelectric means for determining the position of said belt, said belt position determining means being operable to effect the selective operation of said read-write head.

* * * * *